(12) United States Patent
Yamamoto et al.

(10) Patent No.: US 9,242,638 B2
(45) Date of Patent: Jan. 26, 2016

(54) TORQUE TRANSFER SYSTEM

(71) Applicant: DENSO CORPORATION, Kariya, Aichi-pref. (JP)

(72) Inventors: Masakazu Yamamoto, Kariya (JP); Yusuke Fujitsu, Anjo (JP); Hiroaki Ono, Tokoname (JP); Hikaru Shinohara, Chiryu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/315,637

(22) Filed: Jun. 26, 2014

(65) Prior Publication Data
US 2015/0006004 A1 Jan. 1, 2015

(30) Foreign Application Priority Data

Jun. 27, 2013 (JP) ................................. 2013-134895
Mar. 24, 2014 (JP) ................................. 2014-059855

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 20/00* | (2006.01) | |

(52) U.S. Cl.
CPC ............. *B60W 20/10* (2013.01); *Y10S 903/902* (2013.01)

(58) Field of Classification Search
CPC ...................................................... B60W 20/10
USPC .......................................................... 701/22
See application file for complete search history.

(56) References Cited

U.S. PATENT DOCUMENTS

2004/0142790 A1\* 7/2004 Tomura et al. .................... 477/2
2007/0049456 A1 3/2007 Shimizu et al.

FOREIGN PATENT DOCUMENTS

| JP | 2003-176770 | 6/2003 |
|---|---|---|
| JP | 2003-301731 | 10/2003 |
| JP | 2005-90307 | 4/2005 |

\* cited by examiner

*Primary Examiner* — Maceeh Anwari
(74) *Attorney, Agent, or Firm* — Nixon & Vanderhye PC

(57) ABSTRACT

A first shaft has one end coupled to an engine. A damper has a spring coupled the other end of the first shaft. A second shaft has one end coupled to the spring. A third shaft rotates in correspondence to a final output shaft. A fourth shaft has one end coupled to a first rotary electric machine. A power split mechanism is provided among the second shaft, the third shaft and the fourth shaft and transfers torque among the second shaft, the third shaft and the fourth shaft. A control unit calculates a torque correction value for the rotary electric machine based on information indicating torsion angle of the damper and corrects the torque of the rotary electric machine based on a calculated torque correction value.

10 Claims, 14 Drawing Sheets

FIG. 3

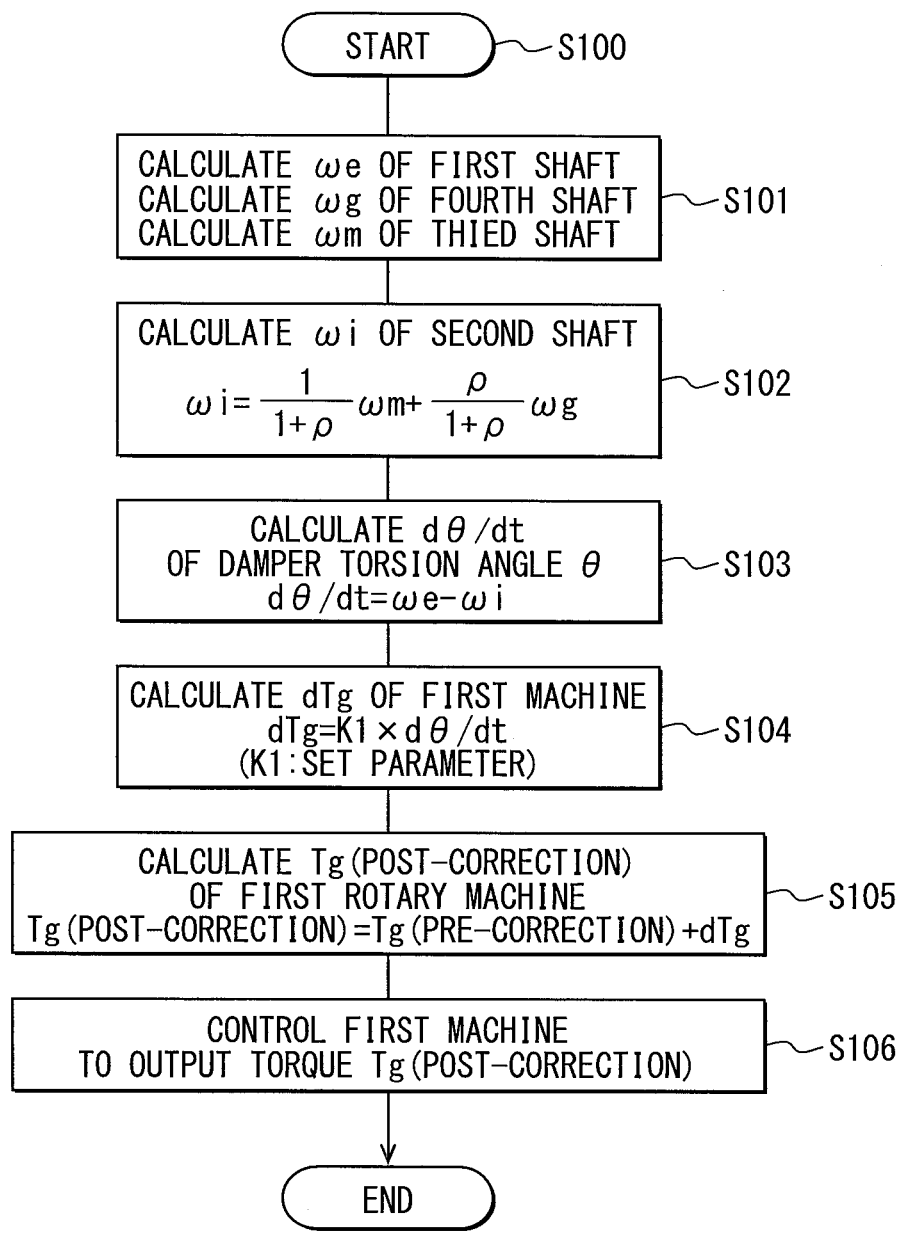

- START — S100
- CALCULATE $\omega e$ OF FIRST SHAFT
  CALCULATE $\omega g$ OF FOURTH SHAFT
  CALCULATE $\omega m$ OF THIED SHAFT — S101
- CALCULATE $\omega i$ OF SECOND SHAFT
  $$\omega i = \frac{1}{1+\rho}\omega m + \frac{\rho}{1+\rho}\omega g$$ — S102
- CALCULATE $d\theta/dt$ OF DAMPER TORSION ANGLE $\theta$
  $d\theta/dt = \omega e - \omega i$ — S103
- CALCULATE $dTg$ OF FIRST MACHINE
  $dTg = K1 \times d\theta/dt$
  (K1: SET PARAMETER) — S104
- CALCULATE Tg(POST-CORRECTION) OF FIRST ROTARY MACHINE
  Tg(POST-CORRECTION) = Tg(PRE-CORRECTION) + dTg — S105
- CONTROL FIRST MACHINE TO OUTPUT TORQUE Tg(POST-CORRECTION) — S106
- END

FIG. 5  COMPARATIVE EXAMPLE
(A)
Ng [rpm]
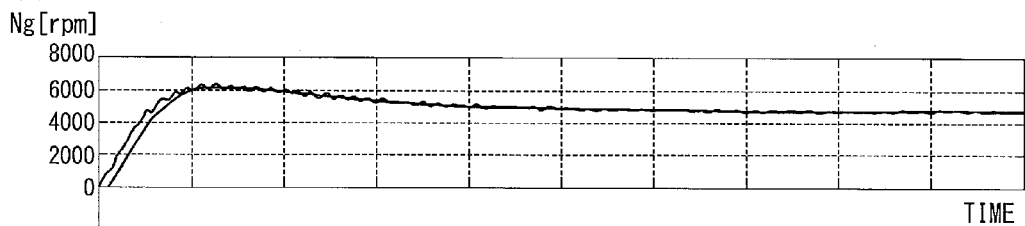
(B)
Ne [rpm]
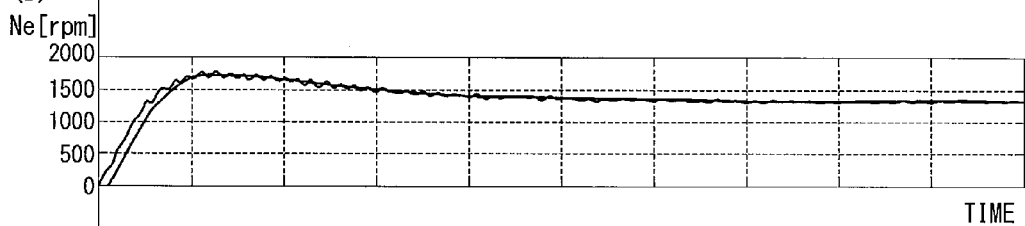
(C)
Te [Nm]
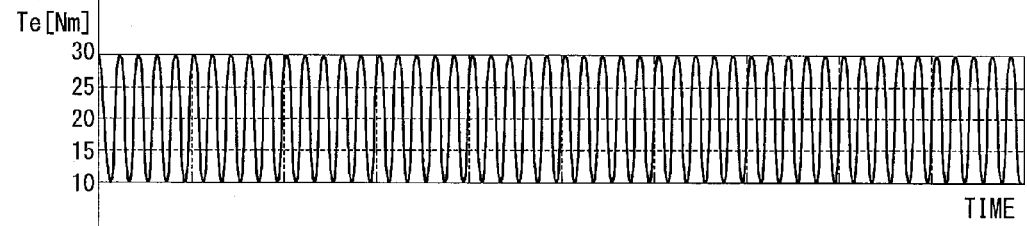
(D)
Tg [Nm]
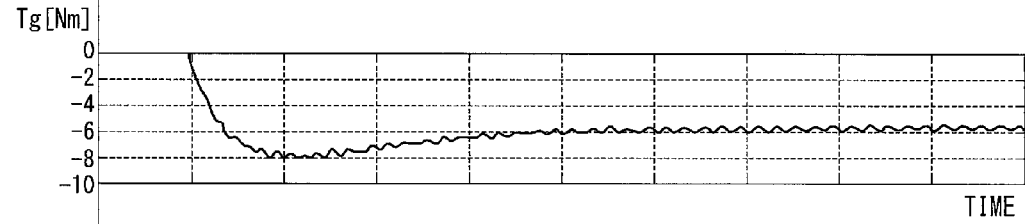
(E)
θ [deg]
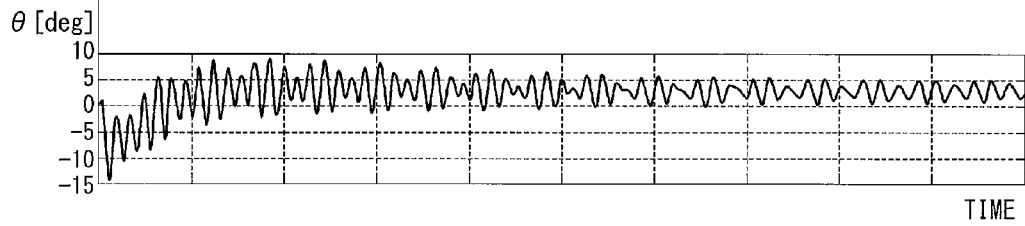

FIG. 8
(A) Ng[rpm]
(B) Ne[rpm]
(C) Te[Nm]
(D) Tg[Nm]
(E) θ[deg]
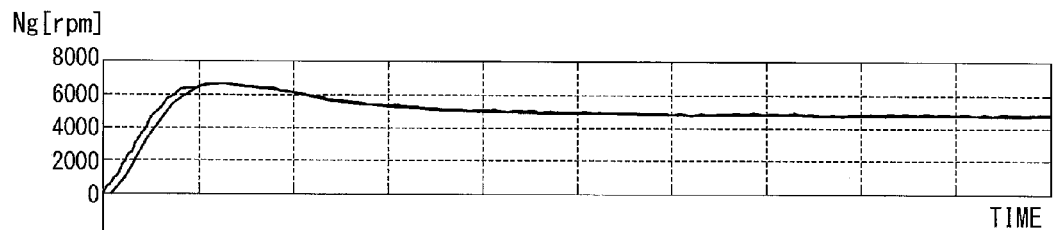
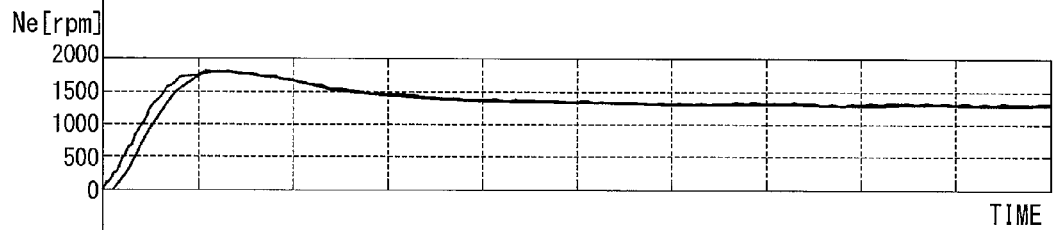
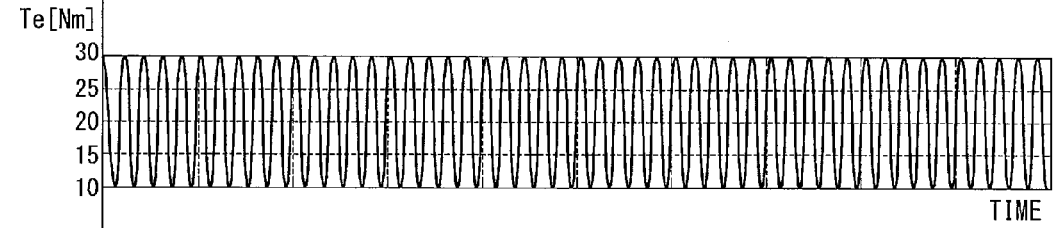
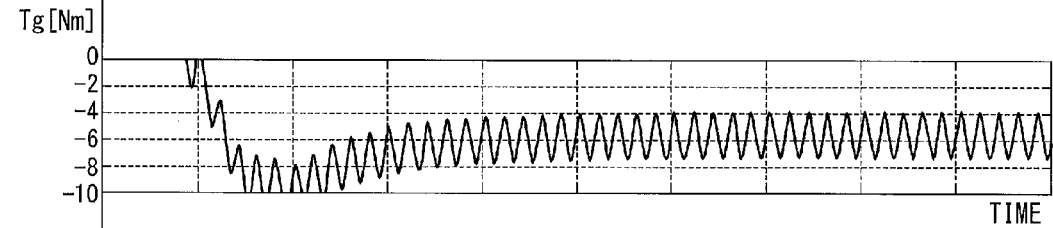
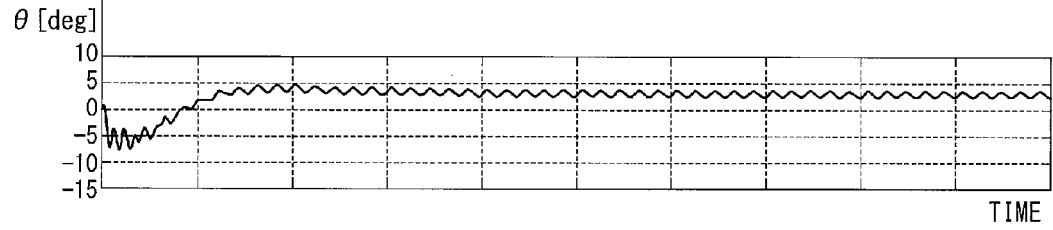

FIG. 9
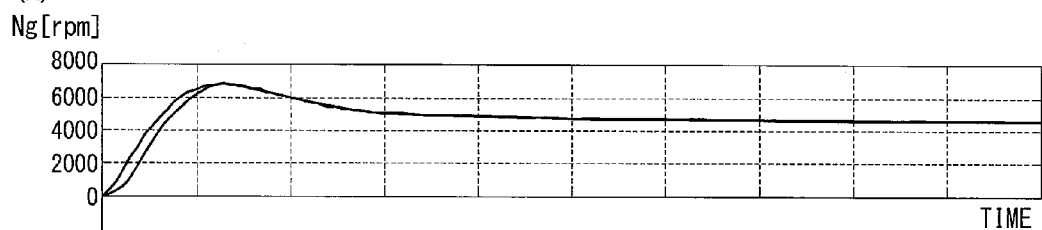
(A) Ng[rpm]
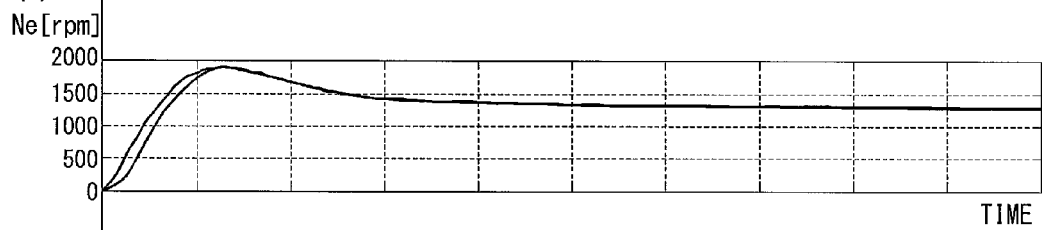
(B) Ne[rpm]
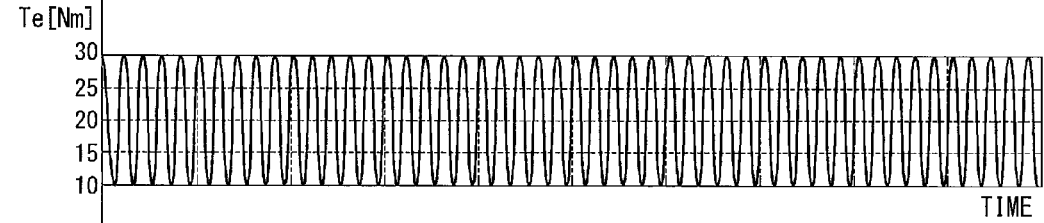
(C) Te[Nm]
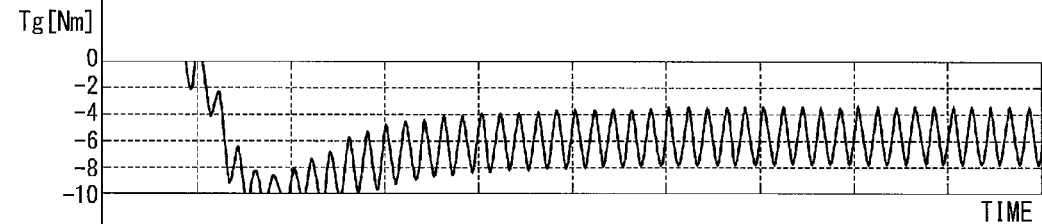
(D) Tg[Nm]
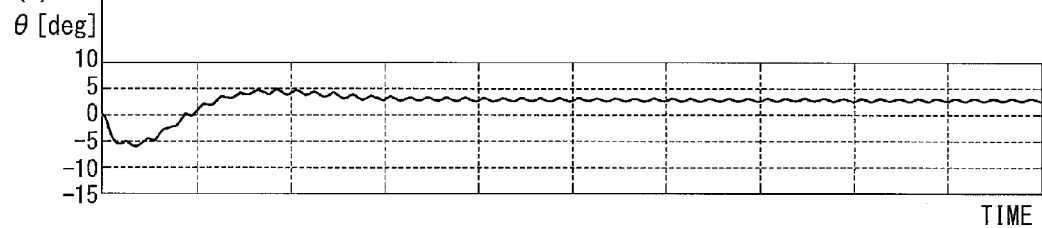
(E) θ[deg]

TORQUE TRANSFER SYSTEM

CROSS REFERENCE TO RELATED APPLICATION

This application is based on and incorporates herein by reference Japanese patent applications No. 2013-134895 filed on Jun. 27, 2013 and No. 2014-059855 filed on Mar. 24, 2014.

FIELD

The present disclosure relates to a torque transfer system, which transfers torque of an internal combustion engine or a rotary electric machine to a final output shaft.

BACKGROUND

A torque transfer system is used conventionally to transfer torque of an internal combustion engine or a rotary electric machine to an axle (drive shaft) of a hybrid vehicle. In a torque transfer system disclosed in patent document (JP-B-3958220), for example, a torsional damper is provided between a crankshaft of an internal combustion engine and a power split mechanism. The torsional damper reduces transfer of torque variation of the crankshaft, which is transferred to the power split mechanism.

In the torque transfer system according to the patent document, the torque variation of the crankshaft often increases when rotation of the internal combustion engine is not stable, particularly when the internal combustion engine is started for example. When the torque variation increases, the torsional damper tends to clatter or clatter and the gears of the power split mechanism hit each other generating tooth hammer sound. The torque transfer system therefore controls the torque of the rotary electric machine, which is coupled to the torsional damper through the power split mechanism, in accordance with the torque variation of the crankshaft so that the torque variation and the tooth hammer sound is reduced.

The torque transfer system according to the patent document estimates the torque variation of the crankshaft based on a map data, which is determined in accordance with an angular position of the crankshaft and a coolant temperature of the engine. The torque transfer system controls the torque of the rotary electric machine based on the estimated torque variation thereby to reduce the torque variation of the crankshaft and the tooth hammer sound of the power split mechanism. The power split mechanism sometimes generates the tooth hammer sound, when an actual torque variation exceeds the estimated torque variation or increases excessively because of resonance in such an occasion as an irregular operation of the internal combustion engine. It is generally not possible to estimate or detect in real time the torque variation of the crankshaft. If a torque meter or the like, which can detect the torque variation in real time, is used, it will add cost.

SUMMARY

It is an object to provide a torque transfer system, which reduces tooth hammer sound of a gear set in simple configuration.

According to one aspect, a torque transfer system, which transfers torque of an internal combustion engine and a rotary electric machine to a final output shaft, comprises a first shaft, a resilient cushioning mechanism, a second shaft, a third shaft, a fourth shaft, a gear part and a control unit. The first shaft has one end coupled to the internal combustion engine for receiving the torque of the engine. The resilient cushioning mechanism has a resilient deformable part coupled to the other end of the first shaft. The second shaft has one end coupled to the resilient deformable part. The third shaft is rotatable in correspondence to the final output shaft. The fourth shaft has one end coupled to the rotary electric machine for receiving the torque of the rotary electric machine. The gear part is provided among the other end of the second shaft, one end of the third shaft and the other end of the fourth shaft for transferring torque one another among the second shaft, the third shaft and the fourth shaft. The control unit controls the torque of the rotary electric machine.

The control unit includes a torque correction value calculation part for calculating a torque correction value, which is a correction value for a torque of the rotary electric machine, based on information indicating torsion angle of the resilient cushioning mechanism, which is a relative angle between the first shaft and the second shaft. The control unit further includes a torque correction part for correcting the torque of the rotary electric machine based on the torque correction value calculated by the torque correction value calculation part.

BRIEF DESCRIPTION OF THE DRAWINGS

FIG. 3 is a flowchart showing torque correction processing executed by a control unit of the torque transfer system according to the first embodiment;

FIG. 5 is a time chart showing changes in a rotation speed of a rotary electric machine, a rotation speed of an internal combustion engine, a torque of the internal combustion engine, a torque of the rotary electric machine and a torsion angle of a resilient cushioning mechanism, respectively, at engine start time in a comparative example;

FIG. 8 is a time chart showing changes in a rotation speed of a rotary electric machine, a rotation speed of an internal combustion engine, a torque of the internal combustion engine, a torque of the rotary electric machine and a torsion angle of a resilient cushioning mechanism, respectively, at engine start time in the second embodiment;

FIG. 9 is a time chart showing changes in a rotation speed of a rotary electric machine, a rotation speed of an internal combustion engine, a torque of the internal combustion engine, a torque of the rotary electric machine and a torsion angle of a resilient cushioning mechanism, respectively, at engine start time in a third embodiment;

EMBODIMENT

Figure 1:
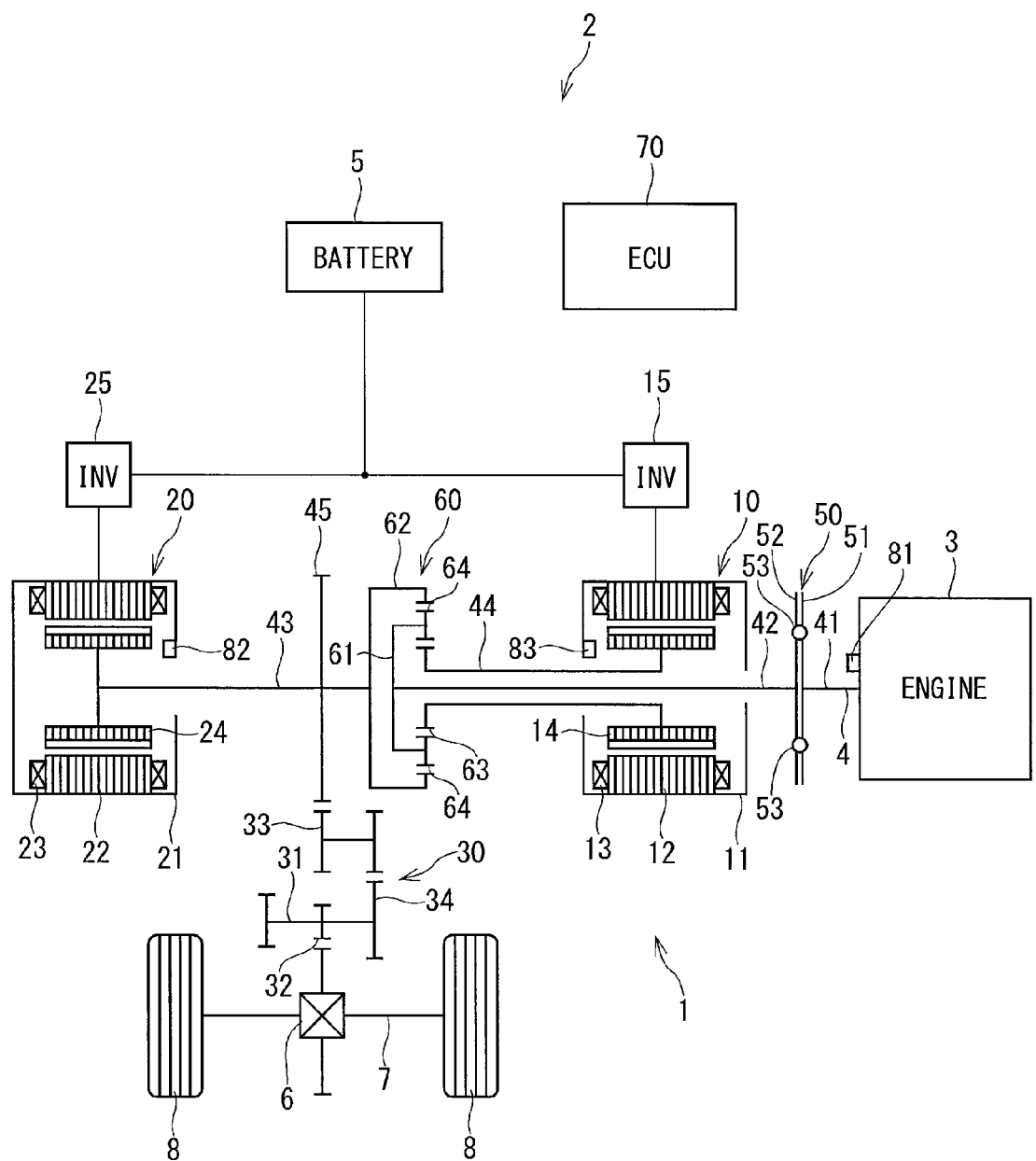
FIG. 1 is a schematic view showing a torque transfer system, which is mounted on a vehicle, according to a first embodiment.

A torque transfer system will be described below with reference to plural embodiments shown in the accompanying drawings. Substantially same structural parts among the embodiments are designated by same reference numerals for simplification of description.

First Embodiment

A torque transfer system according to a first embodiment is shown in FIG. 1. A torque transfer system 1 is mounted on a vehicle 2, which travels with, for example, an internal combustion engine (hereinafter referred to as engine) 3, a first rotary electric machine (first machine) 10 and a second rotary electric machine (second machine) 20 as drive power sources. The vehicle 2 is a hybrid vehicle.

The engine 3 is, for example, a gasoline engine, which operates (rotates) with gasoline as fuel to output torque from a crankshaft 4. The first rotary electric machine 10 and the second rotary electric machine 20 are electric motors, which rotate with electric power supplied from a battery 5 mounted on the vehicle 2 and also generate power in response to inputted torque to charge the battery 5 thereby functioning as power charging generators.

The first rotary electric machine 10 has a housing 11, a stator 12, a coil 13, a rotor 14 and the like. The stator 12 is formed of a metal such as iron and in a hollow tubular shape and fixed to an inside wall of the housing 11. The coil 13 is wound about the stator 12. The rotor 14 is formed of a metal such as iron and in a tubular shape and provided rotatably inside the stator 12. Magnets are fixed to an outside wall of the rotor 14. The coil 13 is supplied with electric power from the battery 5 through a first inverter 15. The stator 12 thus generates a rotary magnetic field to rotate the rotor 14. When the rotor 14 is rotated by external force, a current flows in the coil 13 to charge the battery 5 through the first inverter 15.

The second rotary electric machine 20 has a housing 21, a stator 22, a coil 23, a rotor 24 and the like. The stator 22 is formed of a metal such as iron and in a hollow tubular shape and fixed to an inside wall of the housing 21. The coil 23 is wound about the stator 22. The rotor 24 is formed of a metal such as iron and in a tubular shape and provided rotatably inside the stator 22. Magnets are fixed to an outside wall of the rotor 24. The coil 23 is supplied with power from the battery 5 through a second inverter 25. The stator 22 thus generates a rotary magnetic field to rotate the rotor 24. When the rotor 24 is rotated by external force, a current flows in the coil 23 to charge the battery 5 through the second inverter 25.

The torque transfer system 1 transfers torque of the first rotary electric machine 10 and the second rotary electric machine 20 to a final output shaft 31 of a gear mechanism 30. The torque transferred to the output shaft 31 is transferred to drive wheels 8 through a final gear 32, a differential gear 6 and a wheel axle 7. The vehicle 2 travels with this torque.

The torque transfer system 1 has a first shaft 41, a damper 50 as a resilient cushioning mechanism, a second shaft 42, a third shaft 43, a fourth shaft 44, a power split mechanism 60 as a gear set, an electronic control unit (hereinafter referred to as ECU) 70 as a control unit and the like. The first shaft 41 is formed of, for example, a metal and in a rod shape and provided so that its one end is fixedly coupled to the crankshaft 4 of the engine 3. The first shaft 41 is provided coaxially and integrally with the crankshaft 4. The first shaft 41 thus receives torque of the engine 3.

Figure 2:
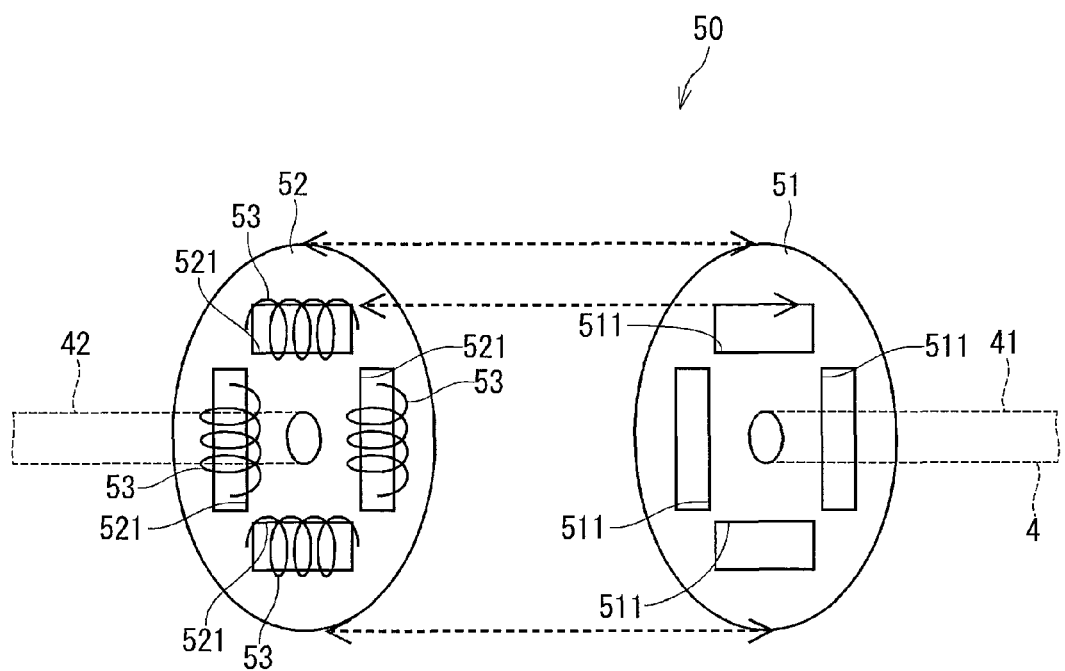
FIG. 2 is an exploded schematic view showing a resilient cushioning mechanism of the torque transfer system according to the first embodiment.

The damper 50 has plates 51, 52, a spring 53 as a resilient deformable member and the like. The plate 51 is formed of, for example, a metal and in generally a disk shape, which has four holes 511 as shown in FIG. 2. Similarly to the plate 51, the plate 52 is formed of, for example, a metal and in generally a disk shape, which has four holes 521. The spring 53 is formed of, for example, a metal and in a coil shape to be resiliently deformable in an axial direction in particular.

The plate 51 and the plate 52 are provided coaxially and in parallel so that the holes 511 and the holes 521 correspond in position to face each other with a predetermined spacing therebetween. The plate 51 and the plate 52 are relatively rotatable. The other end of the first shaft 41 is fixedly coupled to a center of the plate 51. Similarly to the first shaft 41, the second shaft 42 is formed of, for example, a metal and in generally a rod shape so that its one end is fixedly coupled to a center of the plate 52.

The spring 53 is provided in each of the holes 511 of the plate 51 and the holes 521 of the plate 52. Thus, a total of four springs are provided. As a result, when only one of the first shaft 41 and the second shaft 42 rotates rapidly in a short time for example, the spring 53 is sandwiched between an inside wall of the hole 511 of the plate 51 and an inside wall of the hole 521 of the plate 52 to be pressed and resiliently deformed. The restoring force of the spring 53 exerts on the first shaft 41 and the second shaft 42 through the plate 51 and the plate 52. As a result, it is possible to suppress the rapid rotation of one of the first shaft 41 and the second shaft 42 from being transferred as an impact to the other of the first shaft 41 and the second shaft 42. The damper 50 thus operates as a cushioning mechanism, that is, buffer mechanism, and resiliently relaxes the impact between the first shaft 41 and the second shaft 42 by the resiliency of the spring 53. Each plate 51, 52 has a predetermined mass and operates as a flywheel. As a result, even when the crankshaft 4 makes rapid rotation or torque variation at the time of starting the engine 3, for example, it is possible to suppress the impact of rapid rotation or the torque variation from being transferred to the second shaft 42. As described above, the other end of the first shaft 41 is connectable to the spring 53 through the plate 51. One end of the second shaft 42 is connectable to the spring 53 through the plate 52.

The third shaft 43 is formed of, for example, a metal and in a rod shape. The third shaft 43 is coupled to the power split mechanism 60 at its one end and to the rotor 24 of the second rotary electric machine 20 at its other end. Thus the third shaft 43 receives at the other end thereof torque of the second rotary electric machine 20.

A gear 45 is provided integrally with the third shaft 43 in axially a middle part of the third shaft 43. The gear 45 is provided in meshing engagement with a gear 33 of a gear mechanism 30. The gear 33 is provided to be in meshing engagement with a gear 34, which is coupled to the final output shaft 31. Thus the third shaft 43 rotates in correspondence to the final output shaft 31 and the drive wheels 8.

The fourth shaft 44 is formed of, for example, a metal and in a tubular shape. The second shaft 42 is inserted inside the fourth shaft 44. The fourth shaft 44 and the second shaft 42 are relatively rotatable to each other. One end of the fourth shaft 44 is fixedly coupled to the rotor 14 of the first rotary electric machine 10. Thus the fourth shaft 44 receives at one end thereof torque of the first rotary electric machine 10.

The torque split mechanism 60 has a carrier 61, a ring gear 62, a sun gear 63, pinion gears 64 and the like. The carrier 61 is fixedly coupled to the other end of the second shaft 42 to be rotatable with the second shaft 42. The ring gear 62 is fixedly coupled to one end of the third shaft 43 to be rotatable with the third shaft 43. The ring gear 62 is formed internal teeth on its inner rim. The sun gear 63 is fixedly coupled to the other end of the fourth shaft 44 to be rotatable with the fourth shaft 44. The sun gear 63 is formed external teeth on its outer rim.

The pinion gears 64 are provided at plural locations so that each pinion gear 64 rotates itself on the outer rim of the carrier 61. The pinion gear 64 is formed outer teeth on its outer rim. The outer teeth of the pinion gear 64 are formed to be meshed with both of inner teeth of the ring gear 62 and outer teeth of the sun gear 63. Thus, when the carrier 61 rotates integrally with the second shaft 42, the pinion gear 64 revolves about a circumference of the sun gear 63 while rotating itself. In this operation, the ring gear 62 (third shaft 43) rotates relatively to the fourth shaft 44. Thus, the torque split mechanism 60 is provided among the other end of the second shaft 42, one end of the third shaft 43 and the other end of the fourth shaft 44 to be able to transfer torque among the second shaft 42, the third shaft 43 and the fourth shaft 44.

With the above-described configuration, when the first rotary electric machine 10 operates as the generator, the torque split mechanism 60 distributes the torque of the engine 3 inputted from the carrier 61 (second shaft 42) to the sun gear 63 side (fourth shaft 44 side) and the ring gear 62 side (third shaft 43 side) in proportion to a ratio of gears. When the first rotary electric machine 10 operates as the motor, the torque split mechanism 60 combines the torque of the engine 3 inputted from the carrier 61 (second shaft 42) and the torque of the first rotary electric machine 10 inputted from the sun gear 63 (fourth shaft 44) and outputs the combined torque to the ring gear 62 side (third shaft 43 side). The torque outputted to the ring gear 62 is outputted to the drive wheels 8 through the third shaft 43, the gear 45, the gear mechanism 30 (final output shaft 31), the differential gear 6 and the axle 7.

The ECU 70 is a microcomputer, which has a CPU as an arithmetic operation unit, a ROM and a RAM as a memory unit, a timer as a time measuring or counting unit, an I/O as an input/output unit, and the like. The ECU 70 controls the vehicle 2 in an integrated manner by executing predetermined processing stored in a program stored in the ROM based on signals of various sensors attached to various parts of the vehicle 2 and controlling driving of various devices of the vehicle 2.

The ECU 70 controls the operation of the engine 3, the torque of the first rotary electric machine 10 and the torque of the second rotary electric machine 20 based on the signals of the various sensors and changes a ratio of distribution and integration of the torque, which the torque split mechanism 60 performs. Thus the ECU 70 realizes a variety of travel patterns of the vehicle 2.

More specifically, the ECU 70 receives a vehicle speed signal corresponding to a travel speed of the vehicle 2, an accelerator position signal corresponding to an accelerator position, a SOC (state of charge) signal corresponding to a charging rate of the battery 5, and the like. The vehicle speed signal may be a signal outputted from a vehicle speed sensor, for example, which is provided near the drive wheels 8. The accelerator position signal may be a signal outputted from an accelerator position sensor, for example. The SOC signal may be a signal, which is outputted from a battery monitoring circuit or the like, which detects and outputs a charging rate of the battery 5.

In the first embodiment, a crank position sensor 81, a resolver 82 and a resolver 83 are provided further. The crank position sensor 81 is provided near the crankshaft 4 of the engine 3. The crank position sensor 81 detects a rotation position (angular position) of the crankshaft 4 (first shaft 41) and outputs to the ECU 70 a signal corresponding to a detected rotation position. The crank position sensor 81 operates as a first shaft rotation position detecting unit. The ECU 70 calculates (detects) a rotation speed of the crankshaft 4, that is, the first shaft 41, based on the signal from the crank position sensor 81.

The resolver 82 is provided near the rotor 24 of the housing 21 of the second rotary electric machine 20. The resolver 82 detects a rotation position of the rotor 24 (third shaft 43) and outputs to the ECU 70 a signal related to the rotation position. The resolver 82 operates as a third shaft rotation position detecting unit. The ECU 70 calculates (detects) a rotation speed of the rotor 24, that is, the rotation speed of the third shaft 43 (rotor 24), based on the signal from the resolver 82.

The resolver 83 is provided near the rotor 14 of the housing 11 of the first rotary electric machine 10. The resolver 83 detects the rotation position of the rotor 14 (fourth shaft 44) and outputs a signal related to the detected rotation position. The resolver 83 operates as a fourth shaft rotation position detecting unit in claims. The ECU 70 calculates (detects) a rotation speed of the rotor 14, that is, the fourth shaft 44 based on the signal from the resolver 83.

Operations of the torque transfer system 1 and associated devices will be described below in representative travel patterns of the vehicle 2.

[Engine Starting]

When the engine 3 is started under a state that the vehicle 2 is at rest or traveling by the second rotary electric machine 20, the first rotary electric machine 10 is used as the motor. When the first rotary electric machine 10 is driven to rotate, the fourth shaft 44 rotates. Since the pinion gear 64 revolves while rotating itself, the second shaft 42, the first shaft 41 and the crankshaft 4 rotate to start cranking of the engine 3.

[Vehicle Travel Starting]

When the vehicle 2 is started to move, the second rotary electric machine 20 is used as the motor. When the second rotary electric machine 20 is driven to rotate under a state that the engine 3 is stopped, the third shaft 43 rotates. The torque of the third shaft 43 is transferred to the drive wheels 8 through the gear mechanism 30, the differential gear 6 and the axle 7 so that the vehicle 2 starts to move. Since the pinion gear 64 rotates itself, the fourth shaft 44 rotates and the first rotary electric machine 10 runs idle. When the engine 3 rotates under a state that the drive wheels 8 and the third shaft 43 are in rotation, the pinion gear 64 revolves while rotating itself and the fourth shaft 44 rotates. The first rotary electric machine 10 operates as the generator to generate power.

[Normal Vehicle Traveling]

In a vehicle traveling state that a vehicle speed is maintained in a middle or high speed zone by application of a fixed drive power, the rotation and torque of the engine 3 is transferred to the drive wheels 8 by appropriately effecting speed change. This speed change is effected by applying reaction force to the sun gear 63 of the torque split mechanism 60. The reaction force corresponds to power generation load applied to the first rotary electric machine 10. Since the second rotary electric machine 20 is coupled to the ring gear 62, which rotates in correspondence to the drive wheels 8, the second rotary electric machine 20 continues to rotate during the normal vehicle travel operation. Fuel efficiency of the engine 3 varies with a relation between a rotation speed and a load. Under a state that fuel consumption does not change with an increased load, the fuel consumption does not increase with the increase in the power generation load. For this reason, this power is supplied to the second rotary electric machine 20 for combined drive force, which increases the drive force.

[Acceleration]

When a large driving force is required for acceleration or the like, the torque of the second rotary electric machine 20 is added to the torque of the engine 3. In this operation, the vehicle is driven by continuously effecting speed change in a state that the rotation and load of the engine 3 is increased. The first rotary electric machine 10 is loaded to generate power to apply the generated power to the second rotary electric machine 20. If necessary, the generator 20 is supplied with power from the battery 5 to generate more power. In the torque split mechanism 60, the carrier 61 is driven to rotate and revolve so that the speed reduction ratio is increased first. Thus, the vehicle 2 is accelerated with addition of rotation of the second rotary electric machine 20 while the rotation speed of the engine 3 increases. The speed reduction ratio decreases as the travel speed of the vehicle 2 increases. As a result, the engine 3, the first rotary electric machine 10, the second rotary electric machine 20 and the torque split mechanism 60 approach to a direct connection state, in which all of them rotate integrally.

[Regeneration]

When the vehicle 2 decelerates, the second rotary electric machine 20 coupled to the drive wheels 8 is driven to rotate from the drive wheels 8 side. With rotation of the rotor 24 of the second rotary electric machine 20, the coil 23 generates induction current. Thus the second rotary electric machine 20 generates power while generating resistance against rotation. In this operation, rotation change of the entire system is controlled by the load of the first rotary electric machine 10.

In the first embodiment, the damper 50 tends to clatter, when the torque variation of the first shaft 41 coupled to the engine 3 increases at the time of unstable rotation of the engine 3 such as starting of the engine 3. When the damper 50 clatters, the second shaft 42 coupled to the damper 50 also clatters. The gears in the torque split mechanism 60 collide and generate tooth hammer sound.

Therefore, the ECU 70 executes a series of processing S100 shown in FIG. 3 thereby to correct the torque of the first rotary electric machine 10 and suppress the tooth hammer sound.

At S101, the ECU 70 calculates an angular velocity we of the first shaft 41 (engine 3, crankshaft 4), an angular velocity ωg of the fourth shaft 44 (first rotary electric machine 10, rotor 14) and an angular velocity ωm of the third shaft 43 (second rotary electric machine 20, rotor 24).

Specifically the ECU 70 calculates the angular velocity we of the first shaft 41 (engine 3) from the rotation speed of the first shaft 41 (crankshaft 4) calculated from the signal of the crank position sensor 81. The ECU 70 calculates the angular velocity ωg of the fourth shaft 44 (first rotary electric machine 10) from the rotation speed of the fourth shaft 44 (rotor 14) calculated from the signal of the resolver 83. The ECU 70 calculates the angular velocity ωm of the third shaft 43 (second rotary electric machine 10) from the rotation speed of the third shaft 43 (rotor 24) calculated from the signal of the resolver 82.

The ECU 70 then executes S102 following S101. At S102, the ECU 70 calculates an angular velocity ωi of the second shaft 42.

Specifically, the ECU 70 calculates the angular velocity ωi of the second shaft 42 based on the following equation (1).

$$\omega i = \{1/(1+\rho)\}\omega m + \{\rho/(1+\rho)\}\omega g \quad (1)$$

The ECU 70 then executes S103 following S102. At S103, the ECU 70 calculates a differential value dθ/dt of the damper torsion angle θ. Here, the damper torsion angle θ is a torsion angle of the damper 50, which is a relative angle between the first shaft 41 and the second shaft 42.

Specifically, the ECU 70 calculates the differential value dθ/dt based on the following equation (2) from the angular velocity ωe of the first shaft 41 calculated at S102 and the angular velocity ωi of the second shaft 42 calculated at S102.

$$d\theta/dt = \omega e - \omega i \quad (2)$$

The ECU 70 then executes S104 following S103. At S104, the ECU 70 calculates a torque correction value dTg, which is a correction value for the torque of the first rotary electric machine 10 and corresponds to the differential value dθ/dt of the damper torsion angle θ.

Specifically, the ECU 70 calculates the torque correction value dTg based on the following equation (3) from the differential value dθ/dt of the damper torsion angle θ calculated at S103 and a set parameter K1. Here the set parameter K1 is a predetermined value.

$$dTg = K1 \times d\theta/dt \quad (3)$$

The ECU 70 then executes S105 following S104. At S105, the ECU 70 calculates a corrected torque Tg(post-correction) of the first rotary electric machine 10 based on the following equation (4) from the torque correction value dTg calculated at S104.

$$Tg(\text{post-correction}) = Tg(\text{pre-correction}) + dTg \quad (4)$$

Here, Tg(pre-correction) is a corrected torque Tg of the first rotary electric machine 10 calculated at S106 executed previously.

The ECU 70 then executes S106 following S105. At S106, the ECU 70 controls the first rotary electric machine 10 to output the corrected torque Tg(post-correction) of the first rotary electric machine 10 calculated at S105.

The ECU 70 thus finishes a series of processing S100 following S106. The ECU 70 executes S100 again after finishing the series of processing S100.

The ECU 70 operates as a torque correction value calculation part by execution of S101 to S104 and operates as a torque correction part by execution of S105 and S106.

While the ignition switch is in the on-state, the torque of the first rotary electric machine 10 is corrected by repetition of the series of processing S100. As a result, when the rotation of the engine 3 is unstable, the damper 50 is restricted from clattering even when the torque variation of the first shaft 41 coupled to the engine 3 increases. Thus it is possible to suppress the tooth hammer sound generated in the power split mechanism 60.

The torque transfer system 1 according to the first embodiment suppresses the tooth hammer sound generated in the torque split mechanism 60 as described below with reference to FIG. 4.

Figure 4:
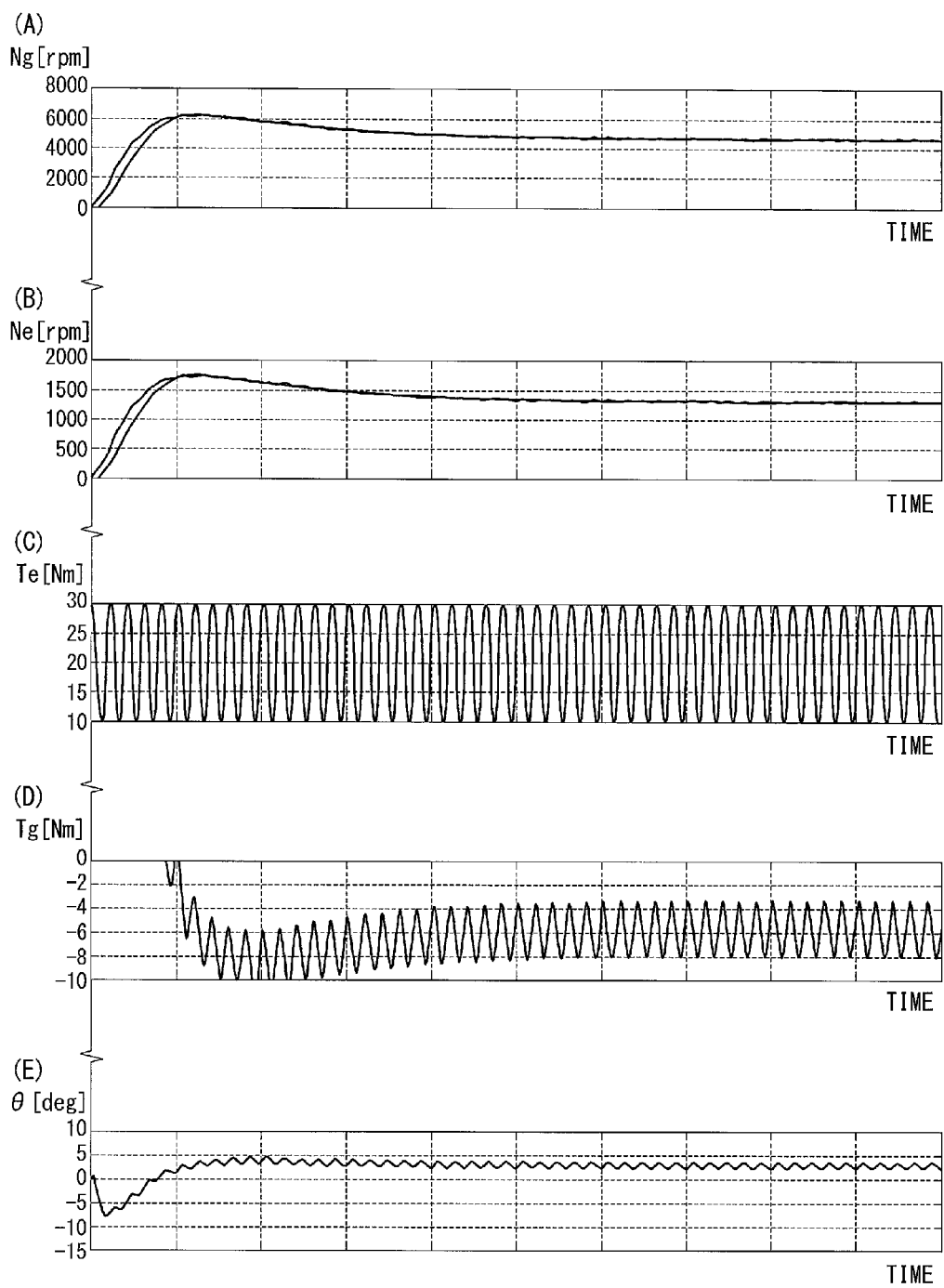
FIG. 4 is a time chart showing changes in a rotation speed of a rotary electric machine, a rotation speed of an internal combustion engine, a torque of the internal combustion engine, a torque of the rotary electric machine and a torsion angle of a resilient cushioning mechanism, respectively, at engine start time in the first embodiment.

In FIG. 4, (A) to (E) show a change of a rotation speed Ng of the first rotary electric machine 10, a change of a rotation speed Ne of the engine 3 and the second shaft 42, a change of a torque Te of the engine, a change of a torque Tg of the first rotary electric machine 10, and a change of a torsion angle θ of the damper 50 with respect to time, when the torque of the first rotary electric machine 10 is corrected by the ECU 70 (S100) of the first embodiment at the time of starting the engine 3 (engine starting operation described above). It is assumed that, as shown by (C), the torque variation of the engine 3 is generated as a sine wave, that is, the torque Te of the engine 3 changes in a sine waveform.

In the first embodiment, since the ECU 70 corrects the torque Tg of the first rotary electric machine 10 as shown by (D) in FIG. 4, the torsion angle θ of the damper 50 continues to be generally stable with only slight variations as shown by (E) in FIG. 4. Thus, the tooth hammer sound of the torque split mechanism 60 can be suppressed.

The advantage of the torque transfer system 1 according to the first embodiment over a torque transfer system according to a comparative example will be described below by describing an operation of the comparative example.

The torque transfer system according to the comparative example is similar to the torque transfer system 1 according to the first embodiment in configuration, but different from the first embodiment in the method of control of the ECU 70 executed for the first rotary electric machine 10. That is, in the torque transfer system according to the comparative example, the ECU 70 does not execute the above-described torque correction (S100) for the first rotary electric machine 10.

In FIG. 5, (A) to (E) show a change of the rotation speed Ng of the first rotary electric machine 10, a change of the rotation speed Ne of the engine 3 and the second shaft 42, a change of the torque Te of the engine 3, a change of the torque Tg of the first rotary electric machine 10 and a change of the torsion angle θ of the damper 50 with respect to time at the time of starting the engine 3 of the vehicle 2, which is provided with the torque transfer system of the comparative example. It is also assumed that, as shown by (C) in FIG. 5 the torque variation of the engine 3 is generated as a sine wave.

Since the ECU 70 does not execute the torque correction for the first rotary electric machine 10 in the comparative example as shown by (D) in FIG. 5, the torsion angle θ of the damper continues to vary largely. Thus it is likely that the torque split mechanism 60 generates the tooth hammer sound.

As described above, the first embodiment is advantageous over the comparative example in that the first embodiment can suppress the tooth hammer sound of the torque split mechanism 60.

As described above, according to the first embodiment, the ECU 70 operates as a torque correction value calculation part and calculates the torque correction value dTg, which is a correction value to torque of the first rotary electric machine 10, based on information related to the torsion angle of the damper 50, which is a relative angle between the first shaft 41 and the second shaft 42. The ECU 70 further operates as a torque correction part and corrects the torque of the first rotary electric machine 10 based on the calculated torque correction value dTg. Thus, in a state that the rotation of the engine 3 is unstable at the time of, for example, starting the engine 3, the damper 50 is restricted from rattling even when the torque variation of the first shaft 41 coupled to the engine 3 increases. As a result, the tooth hammer sound of the torque split mechanism 60 can be suppressed.

Further, the ECU 70 operates as the torque correction value calculation part and calculates the torque correction value dTg based on the differential value of the torsion angle of the damper 50.

Further, the torque transfer system 1 has the crank position sensor 81 for detecting the rotation position of the first shaft 41, the resolver 83 for detecting the rotation position of the third shaft 43 and the resolver 82 for detecting the rotation position of the fourth shaft 44. The ECU 70 operates as the torque correction value calculation part and calculates the differential value of the torsion angle of the damper 50 based on the detected rotation position of the first shaft 41, the detected rotation position of the third shaft 43 and the detected rotation position of the fourth shaft 44.

Second Embodiment

Figure 6:
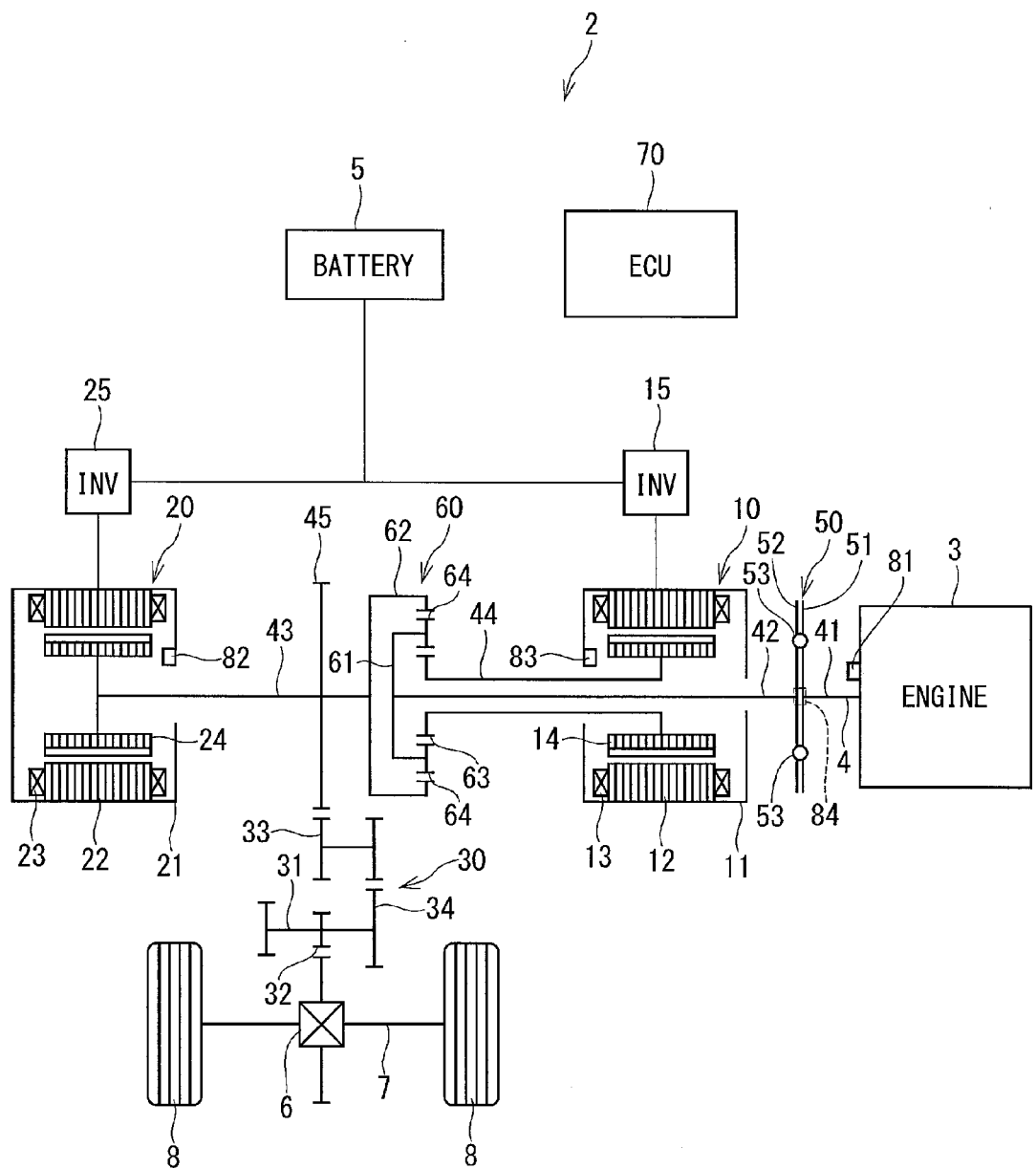
FIG. 6 is a schematic view showing a torque transfer system, which is mounted on a vehicle, according to a second embodiment.

A torque transfer system according to a second embodiment is shown in FIG. 6. The second embodiment is different from the first embodiment in physical configuration and the method of torque correction executed by the ECU 70.

In the second embodiment, the torque transfer system further has an angle sensor 84 as a torsion angle detection part.

The angle sensor 84 is provided between the first shaft 41 and the second shaft 42 of the damper 50 to detect the relative angle between the first shaft 41 and the second shaft 42, that is, the torsion angle of the damper 50 (damper torsion angle). The angle sensor 84 outputs information related to the detected torsion angle of the damper 50 to the ECU 70.

Figure 7:
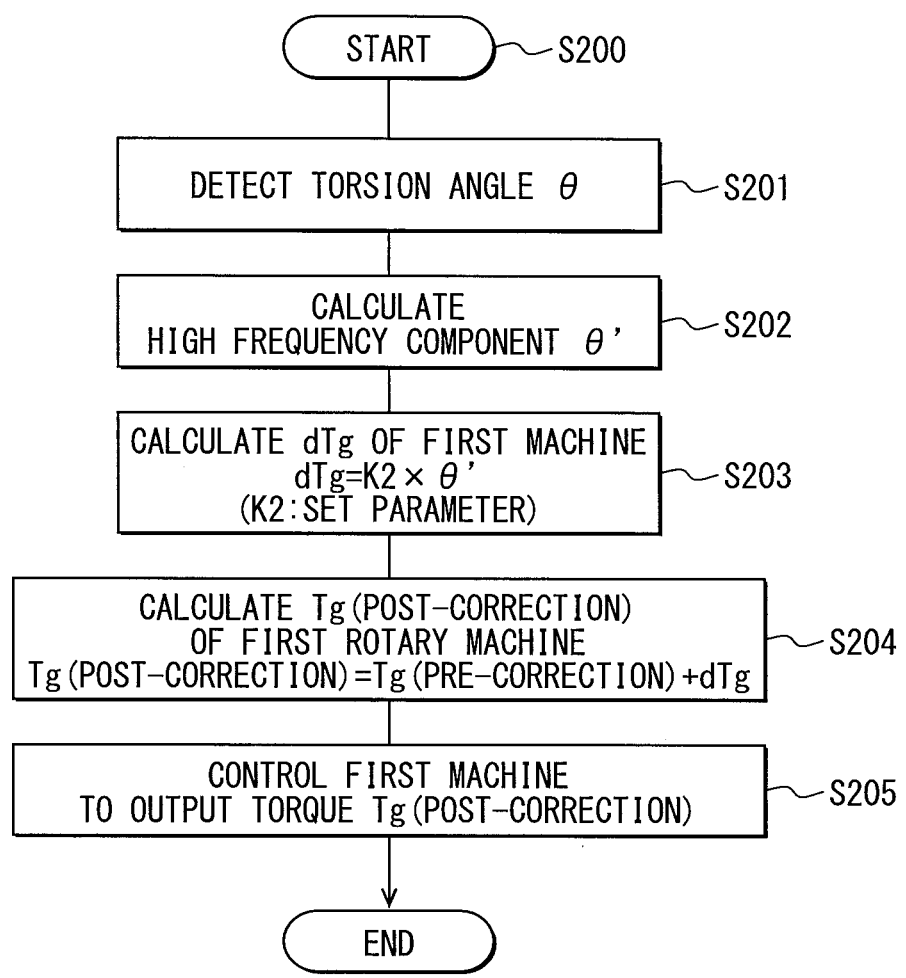
FIG. 7 is a flowchart showing torque correction processing executed by a control unit of the torque transfer system according to the second embodiment.

In the second embodiment, the ECU 70 executes a series of processing S200 shown in FIG. 7 to suppress the tooth hammer sound of the torque split mechanism 60 by correcting the torque of the first rotary electric machine 10.

The ECU 70 starts execution of a series of processing S200 when the ignition key of the vehicle 2 is turned on and repeats it until the ignition key is turned off.

At S201, the ECU 70 detects the damper torsion angle θ by the angle sensor 84.

The ECU 70 executes S202 following S201. At S202, the ECU 70 calculates a high frequency component θ' of a signal corresponding to the damper torsion angle θ.

Specifically the ECU 70 calculates the high frequency component θ' of the signal corresponding to the damper torsion angle θ by high-pass filtering the signal corresponding to the damper torsion angle θ detected at S201.

The ECU 70 executes S203 following S202. At S203, the ECU 70 calculates the torque correction value dTg, which is a correction value of the torque of the first rotary electric machine 10, in correspondence to the high frequency component θ' of the signal corresponding to the damper torsion angle θ.

Specifically, the ECU 70 calculates the torque correction value dTg from the high frequency component θ' of the signal corresponding to the damper torsion angle θ, which is calculated at S202, and a set parameter K2 based on the following equation (5). Here the set parameter K2 is a predetermined value.

$$dTg = K2 \times \theta' \quad (5)$$

The ECU 70 executes S204 following S203. At S204, the ECU 70 calculates the corrected torque Tg of the first rotary electric machine 10.

Specifically, the ECU 70 calculates the corrected torque Tg (post-correction) of the first rotary electric machine 10 based on the following equation (6) from the torque correction value dTg calculated at S203 based on the following equation (6).

$$Tg(\text{post-correction})=Tg(\text{pre-correction})+dTg \quad (6)$$

Here, Tg(pre-correction) is the corrected torque of the first rotary electric machine 10 calculated at S204 previously.

The ECU 70 executes S205 following S204. At S205, the ECU 70 controls the first rotary electric machine 10 to output the corrected torque (post-correction) of the first rotary electric machine 10 calculated at S204.

The ECU 70 finishes the series of processing S200 following S205. The ECU 70 starts the series of processing S200 again after finishing the S200.

The ECU 70 operates as the torque correction value calculation part by execution of S201 to S203. The ECU 70 further operates as the torque correction part by execution of S204 and S205.

While the ignition key is in the on-state, the above-described processing S200 is repeated to thereby correct the torque of the first rotary electric machine 10. It is thus possible to suppress clattering of the damper 50, even when the torque variation of the first shaft 41 coupled to the engine 3 increases under the state that the rotation of the engine 3 is unstable at, for example, the time of starting the engine 3.

As a result, the tooth hammer sound of the torque split mechanism 60 can be suppressed.

The torque transfer system according to the second embodiment suppresses the tooth hammer sound of the torque split mechanism 60 as described below with reference to FIG. 8.

In FIG. 8, (A) to (E) show a change of the rotation speed Ng of the first rotary electric machine 10, a change of the rotation speed Ne of the engine 3, a change of the torque Te of the engine 3, a change of the torque Tg of the first rotary electric machine 10 and a change of the torsion angle θ of the damper 50 with respect to time, when the torque of the first rotary electric machine 10 is corrected by the ECU 70 (S200) of the second embodiment at the time of starting the engine 3 (engine starting operation described above). It is assumed that, as shown by (C) in FIG. 8, the torque variation of the engine 3 is generated as a sine wave.

In the second embodiment, since the ECU 70 corrects the torque Tg of the first rotary electric machine 10 as shown by (D) in FIG. 8, the torsion angle θ of the damper 50 is generally stable with only slight variations as shown by (E) in FIG. 8. Thus, similarly to the first embodiment, the tooth hammer sound of the torque split mechanism 60 can be suppressed.

As described above, the angle sensor 84 is provided for detecting the torsion angle of the damper 50 in the second embodiment. The ECU 70 operates as the torque correction value calculation part and calculates the torque correction value dTg based on the high frequency component θ' of the signal, which corresponds to the torsion angle θ of the damper 50.

According to the second embodiment, similarly to the first embodiment, the tooth hammer sound of the torque split mechanism 60 can be suppressed by correcting the torque Tg of the first rotary electric machine 10 based on the high frequency component θ' of the signal, which corresponds to the torsion angle θ of the damper 50.

Third Embodiment

A torque transfer system according to a third embodiment will be described below.

A torque transfer system according to a third embodiment is similar to the second embodiment in physical configuration but different from the second embodiment in the method of torque correction for the first rotary electric machine 10.

In the third embodiment, the ECU 70 calculates the corrected torque Tg of the first rotary electric machine 10 based on a sum of the torque correction value dTg(K1×dθ/dt), which is calculated at S104 in the first embodiment, and the torque correction value dTg(K2×θ'), which is calculated at S203 in the second embodiment. The ECU 70 then controls the first rotary electric machine 10 to output the corrected torque Tg(post-correction) calculated as described above. That is, according to the third embodiment, the ECU 70 corrects the torque of the first rotary electric machine 10 by combining the torque correction executed in the first embodiment and the torque correction executed in the second embodiment.

The torque transfer system according to the second embodiment suppresses the tooth hammer sound of the torque split mechanism 60 as described below with reference to FIG. 9.

In FIG. 9, (A) to (E) show changes of a rotation speed Ng of the first rotary electric machine 10, a rotation speed Ne of the engine 3, a torque Te of the engine 3, a torque Tg of the first rotary electric machine 10 and a torsion angle θ of the damper 50 with respect to time, when the torque of the first rotary electric machine 10 is corrected by the ECU 70 of the third embodiment at the time of starting the engine 3 (engine starting operation described above). It is assumed that, as shown by (C) in FIG. 9, the torque variation of the engine 3 is generated as a sine wave.

In the third embodiment, since the ECU 70 corrects the torque of the first rotary electric machine 10 as shown by (D) in FIG. 9, the torsion angle of the damper 50 is generally stable with only slight variations as shown by (E) in FIG. 9. It is noted that the third embodiment can suppress more tooth hammer sound of the torque split mechanism 60 than the first embodiment and the second embodiment.

Fourth Embodiment

Figure 11:
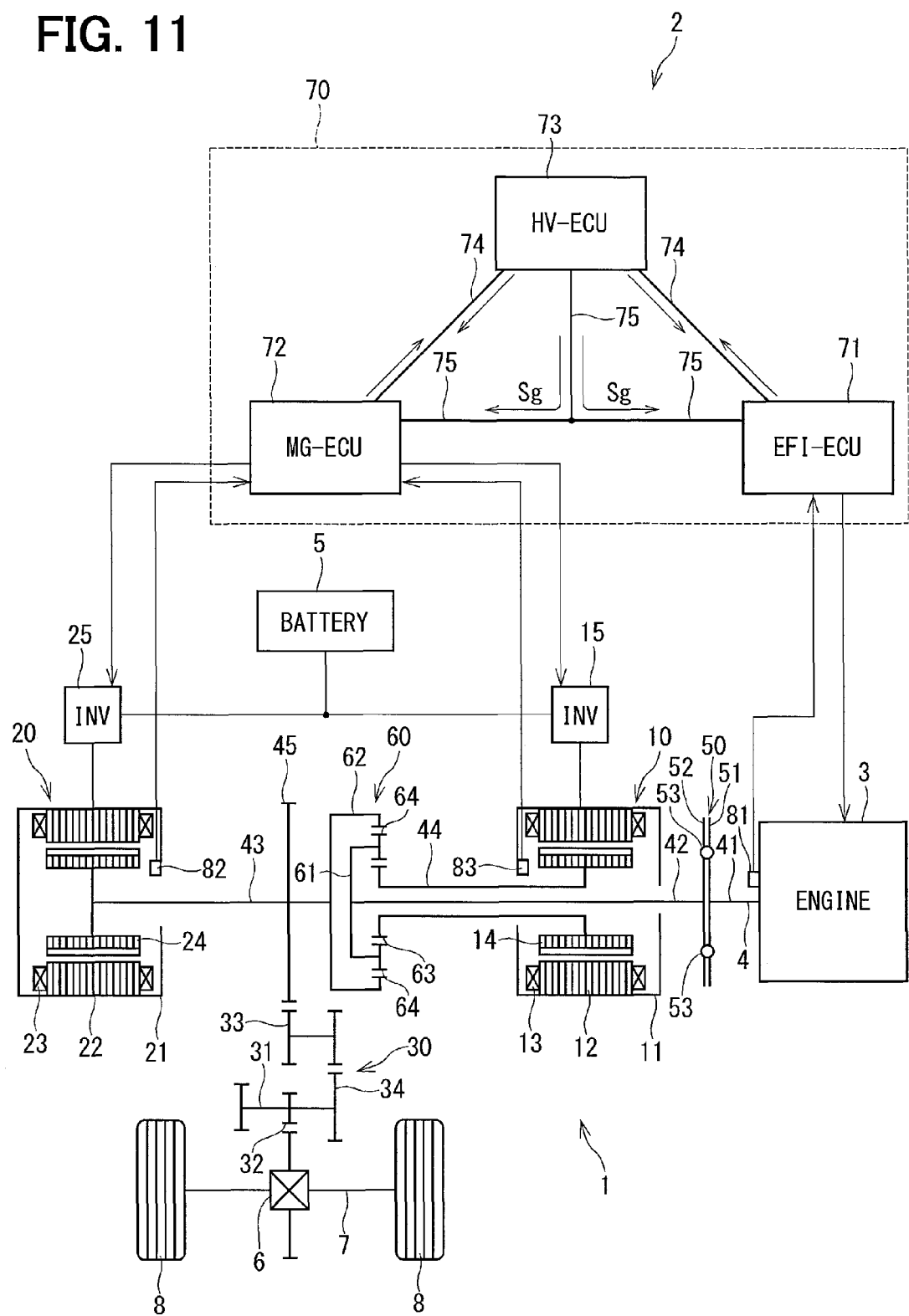
FIG. 11 is a schematic view showing a torque transfer system, which is mounted on a vehicle, according to a fourth embodiment.

A torque transfer system according to a fourth embodiment is shown in FIG. 11. The fourth embodiment is different from the first embodiment in the configuration of a control unit (ECU 70).

As shown in FIG. 11, in the fourth embodiment, the ECU 70 includes an EFI-ECU 71, a MG-ECU 72 and a HV-ECU 73. That is, the ECU 70 is formed of three ECUs in the fourth embodiment contrary to the first embodiment, in which only one ECU is provided.

Each of the EFI-ECU 71, the MG-ECU 72 and the HV-ECU 73 is a microcomputer, which includes a CPU as an arithmetic operation part, a ROM and a RAM as a memory part, a timer as a time measuring part, an I/O as an input/output part and the like.

The EFI-ECU 71 executes processing defined by a program stored in the ROM to control the engine 3 based on signals from various sensors provided at various locations of the vehicle 2.

The MG-ECU 72 executes processing defined by a program stored in the ROM to control the first rotary electric machine 10 and the second rotary electric machine 20 based on signals from various sensors provided at various locations of the vehicle 2.

The HV-ECU 73 executes processing defined by a program stored in the ROM to control the engine 3, the first rotary electric machine 10 and the second rotary electric machine 20 through the EFI-ECU 71 and the MG-ECU 72 based on signals from various sensors provided at various locations of the vehicle 2.

Here, the EFI-ECU 71, the MG-ECU 72 and the HV-ECU 73 operate as a first control part, a second control part and a third control part, respectively.

The HV-ECU 73 controls the operation of the engine 3 and the torques of the first rotary electric machine 10 and the second rotary electric machine 20 based on the signals from the various sensors thereby to change the ratios of distribution and integration of torque executed by the torque split mechanism 60. Thus the HV-ECU 73 realizes various travel patterns of the vehicle 2.

The ECU 70 has signal lines 74 and 75. The signal lines 74 and 75 may be formed of metals. The signal line 74 is provided to connect the HV-ECU 73 to the EFI-ECU 71 and the MG-ECU 72. In the signal line 74, a current (control information) flows. This current is determined in accordance with CAN (Controller Area Network) protocol, which standardizes transmission of control information for devices. The HV-ECU 73 exchanges control information with the EFI-ECU 71 and the MG-ECU 72 through the signal line 74 to control devices of the vehicle 2, which include the engine 3, the first rotary electric machine 10 and the second rotary electric machine 20.

Thus, a plurality of electronic control units (ECUs) transmits and receives control information for controlling the vehicle 2 so that the plurality of electronic control units cooperatively controls the vehicle 2.

Figure 12:
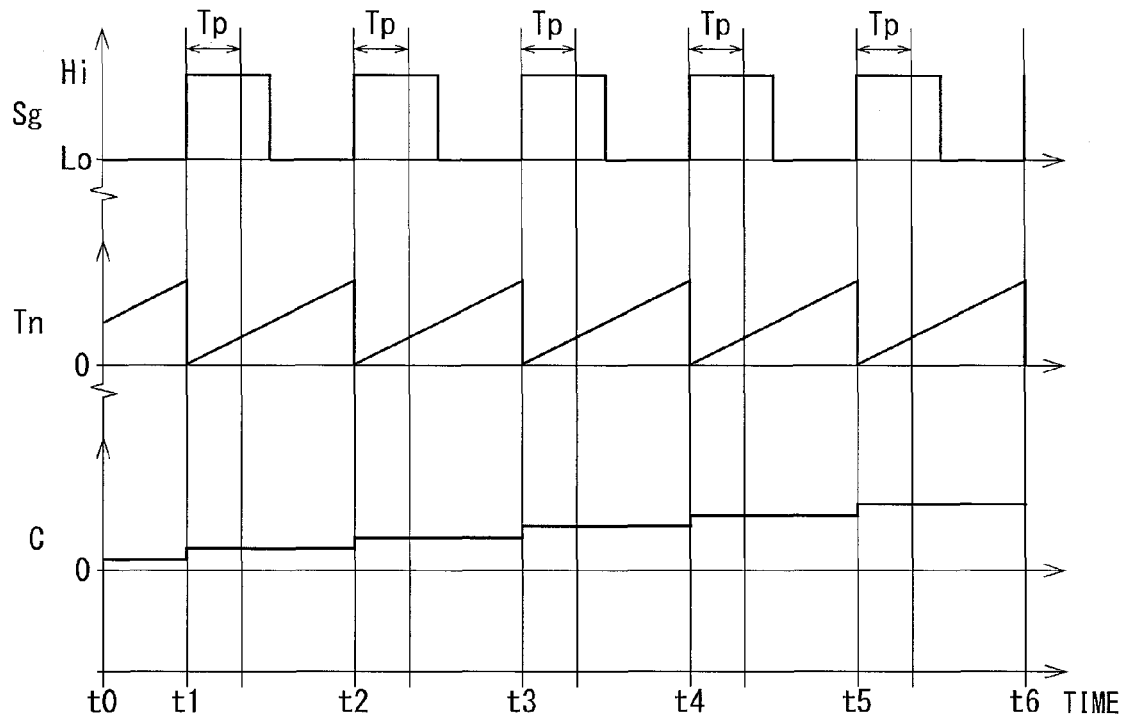
FIG. 12 is a time chart showing time changes of a synchronization signal, which the torque transfer system according to the fourth embodiment generates or transmits and receives, internal time and count value.

The signal line 75 is provided to connect the HV-ECU 73, the EFI-ECU 71 and the MG-ECU 72 mutually. In the signal line 75, a signal Sg flows as a synchronization signal. This signal line 75 corresponds to a signal line. This signal Sg is a rectangular pulse signal, which changes to a low level (Lo) and a high level (Hi) periodically as shown in FIG. 12. The signal Sg is generated by the HV-ECU 73 and outputted (transmitted) to the EFI-ECU 71 and the MG-ECU 72 at the same time.

Figure 13:
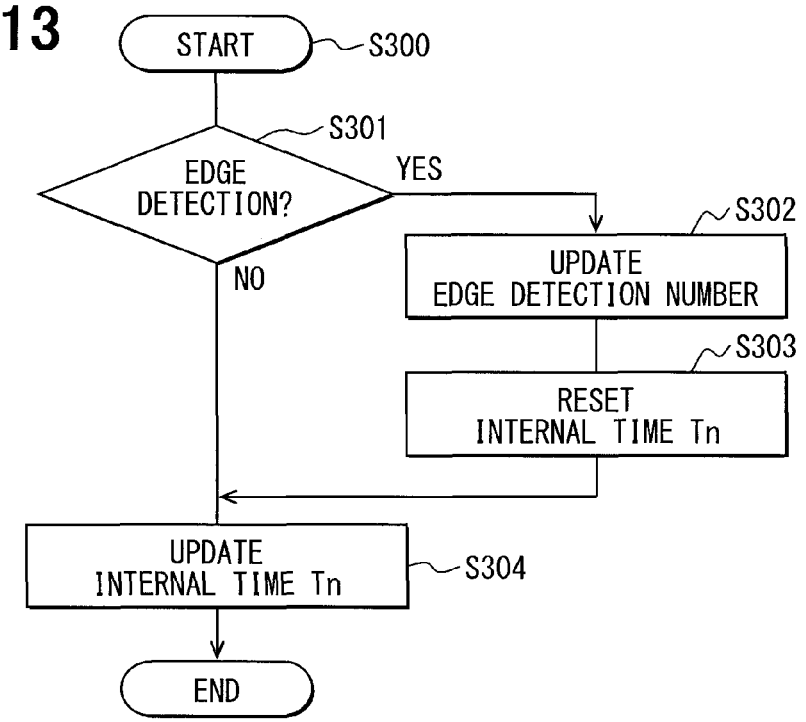
FIG. 13 is a flowchart showing internal time synchronization processing executed by a control unit of the torque transfer system according to the fourth embodiment.

The HV-ECU 73, the EFI-ECU 71 and the MG-ECU 72 execute a series of processing S300, which is related to synchronization of internal time Tn, respectively, and shown in FIG. 13. This series of processing S300 is started in each of the HV-ECU 73, the EFI-ECU 71 and the MG-ECU 72, when the ignition key of the vehicle 2 is turned on.

At S301, each ECU checks whether an edge of the signal Sg, which is generated or received, is detected. The edge of the signal Sg indicates a time point of a rise or a fall of a pulse of the signal Sg for example. If the edge of the signal Sg is detected (S301: YES), the ECU executes S302. If the edge of the signal Sg is not detected (S301: NO), the ECU executes S304.

At S302, the ECU updates the number of times of detection of the edge of the signal Sg. Here, the count C indicating the number of times of detection of the edges of the signal Sg is incremented by one. The ECU executes S303 following S302.

At S303, the ECU rests the internal time Tn. Here, the internal time Tn is set to 0. The ECU executes S304 following S303.

At S304 following S301 or S303, the ECU updates the internal time Tn. Here, the ECU increments the internal time by a predetermined value. The ECU finishes the series of processing S300 following S304.

With the ignition key being in the on-state, when the series of processing S300 is finished following S304, S300 is executed again. That is, the series of processing S300 is repeated while the ignition key remains turned on.

As described above, the HV-ECU 73 transmits the signal Sg to the EFI-ECU 71 and the MG-ECU 72 at the same time as generating the signal Sg. Each ECU (HV-ECU 73, EFI-ECU 71 and MG-ECU 72) determines the internal time Tn by executing the series of processing S300. Thus each ECU can synchronize its internal time Tn.

FIG. 12 shows changes of the internal time Tn and the count (counter) C in each ECU with respect to time when the series of processing S300 is executed. As shown in FIG. 12, the internal time Tn is reset to 0 when the edge of the signal Sg is detected (time point of rise of the pulse: t1 to t6). The internal time Tn then increases until the edge is detected next time. The count C is incremented by one each time the edge of the signal Sg is detected.

In the fourth embodiment, the crank position sensor 81 (first shaft rotation position detection part) detects the rotation position of the crankshaft 4 of the engine 3 and outputs a signal related to the detected rotation position to the EFI-ECU 71. The resolver 83 (fourth shaft rotation position detection part) detects the rotation position of the rotor 14 (fourth shaft 44) of the first rotary electric machine 10 and outputs a signal related to the detected rotation position to the MG-ECU 72. The resolver 82 (third shaft rotation position detection part) detects the rotation position of the rotor 24 (third shaft 43) of the second rotary electric machine 20 and outputs a signal related to the detected rotation position to the MG-ECU 72.

The EFI-ECU 71 calculates at S101 the rotation speed of the first shaft 41 based on the rotation position of the first shaft 41 detected by the crank position sensor 81 when a predetermined time Tp elapses from the detection of the edge of the signal Sg for example, and then calculates the angular velocity we of the first shaft 41 based on the calculated rotation speed of the first shaft 41. The predetermined time Tp is shorter than a period of the pulse of the signal Sg. The EFI-ECU 71 outputs (transmits) a signal (information) to the HV-ECU 73 through the signal line 74. This signal is a combination of the calculated angular velocity we of the first shaft 41 and the count (counter value) C at the time of detection of the rotation position of the first shaft 41.

The MG-ECU 72 calculates at S101 the rotation speeds of the fourth shaft 44 and the third shaft 43 based on the rotation positions of the fourth shaft 44 and the third shaft 43 detected by the resolvers 83 and 82 when the predetermined time Tp elapses from the detection of the edge of the signal Sg for example, and then calculates the angular velocities ωg and ωm of the fourth shaft 44 and the third shaft 43 based on the calculated rotation speeds of the fourth shaft 44 and the third shaft 43, respectively. The MG-ECU 72 outputs (transmits) signals (information) to the HV-ECU 73 through the signal line 74. These signals are a sum of the calculated angular velocity ωg of the fourth shaft 44 and the count C at the time of detection of the rotation position of the fourth shaft 44 and a sum of the calculated angular velocity ωm of the third shaft 43 and the count C at the time of detection of the rotation position of the third shaft 43.

The HV-ECU 73 calculates at S102 and S103 the angular velocity ωi of the second shaft 42 based on the angular velocity we of the first shaft 41, the angular velocity ωg of the fourth shaft 44 and the angular velocity ωm of the third shaft 43, which are received from the EFI-ECU 71 and the MG-ECU 72 at the time of the same counter value c, and calculates the differential value dθ/dt of the damper torsion angle θ. The HV-ECU 73 further calculates at S104 the torque correction value dTg for the first rotary electric machine 10 in accordance with the differential value dθ/dt of the calculated damper torsion angle θ. The HV-ECU 73 then outputs (transmits) a signal (information), which is related to the calculated torque correction value dTg to the MG-ECU 72 through the signal line 74.

The MG-ECU 72 calculates at S105 the corrected torque Tg of the first rotary electric machine 10 based on the signal, which is received from the HV-ECU 73 and related to the torque correction value dTg. The MG-ECU 72 controls at S106 the first rotary electric machine 10 to output the calculated corrected torque Tg (post-correction) of the first rotary electric machine 10. The HV-ECU 73 then calculates the angular velocity ωi of the second shaft 42 based on the angular velocity ωe of the first shaft 41, the angular velocity ωg of the fourth shaft 44 and the angular velocity ωm of the third shaft 43, which are received from the EFI-ECU 71 and the MG-ECU 72 at the time of the same counter value c, and calculates the differential value dθ/dt of the damper torsion angle θ. The HV-ECU 73 further calculates at S104 the torque correction value dTg for the first rotary electric machine 10 in accordance with the differential value dθ/dt of the calculated damper torsion angle θ. The HV-ECU 73 then outputs (transmits) a signal (information), which is related to the calculated torque correction value dTg to the MG-ECU 72 through the signal line 74. Since the ECU 70 (EFI-ECU 71, MG-ECU 72 and HV-ECU 73) executes the series of processing S100 as described above, the torque of the first rotary electric machine 10 is corrected and the tooth hammer sound of the torque split mechanism 60 is suppressed.

As described above, the ECU 70 according to the fourth embodiment includes the EFI-ECU 71 for controlling the engine 3 and the MG-ECU 72 for controlling the first rotary electric machine 10 and the second rotary electric machine 20. The crank position sensor 81 outputs the signal related to the detected rotation position of the first shaft 41 to the EFI-ECU 71. The resolver 82 outputs the signal related to the detected rotation position of the third shaft 43 to the MG-ECU 72. The resolver 83 outputs the signal related to the detected rotation position of the fourth shaft 44 to the MG-ECU 72.

The ECU 70 further includes the HV-ECU 73 for controlling the engine 3, the first rotary electric machine 10 and the second rotary electric machine 20 through the EFI-ECU 71 and the MG-ECU 72. The ECU 70 further includes the signal line 75, which connects the EFI-ECU 71, the MG-ECU 72 and the HV-ECU 73 one another.

The EFI-ECU 71, the MG-ECU 72 and the HV-ECU 73 calculates respective internal times Tn based on the signal Sg, which flows in the signal line 75. The EFI-ECU 71, the MG-ECU 72 and the HV-ECU 73 calculate the differential value dθ/dt of the damper torsion angle θ while synchronizing time points of detecting the rotation positions of the first shaft 41, the third shaft 43 and the fourth shaft 44, and correct the torque of the first rotary electric machine 10. Thus the torque of the first rotary electric machine 10 can be corrected with high accuracy in the present embodiment, in which the ECU 70 is formed of the plurality of ECUs and the detection signals are outputted (transmitted) to other ECUs. As a result, the tooth hammer sound of the torque split mechanism 60 can be suppressed with high accuracy.

Further, only one (HV-ECU 73) of the plurality of the ECUs (EFI-ECU 71, MG-ECU 72 and HV-ECU 73) generates the signal Sg and outputs the generated signal Sg to the other ECUs (EFI-ECU 71 and MG-ECU 72).

Fifth Embodiment

Figure 14:
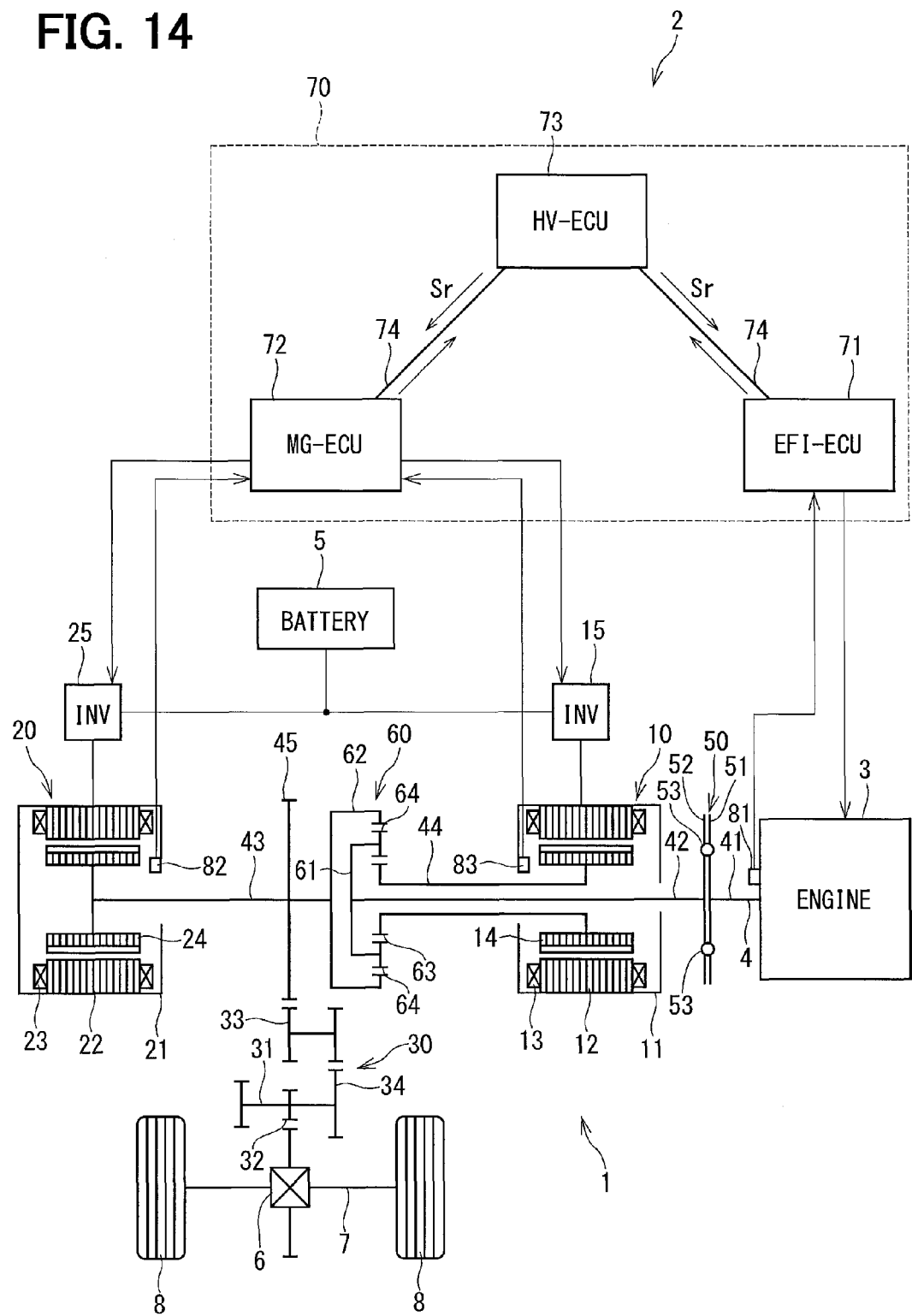
FIG. 14 is a schematic view showing a torque transfer system, which is mounted on a vehicle, according to a fifth embodiment.
Figure 15:
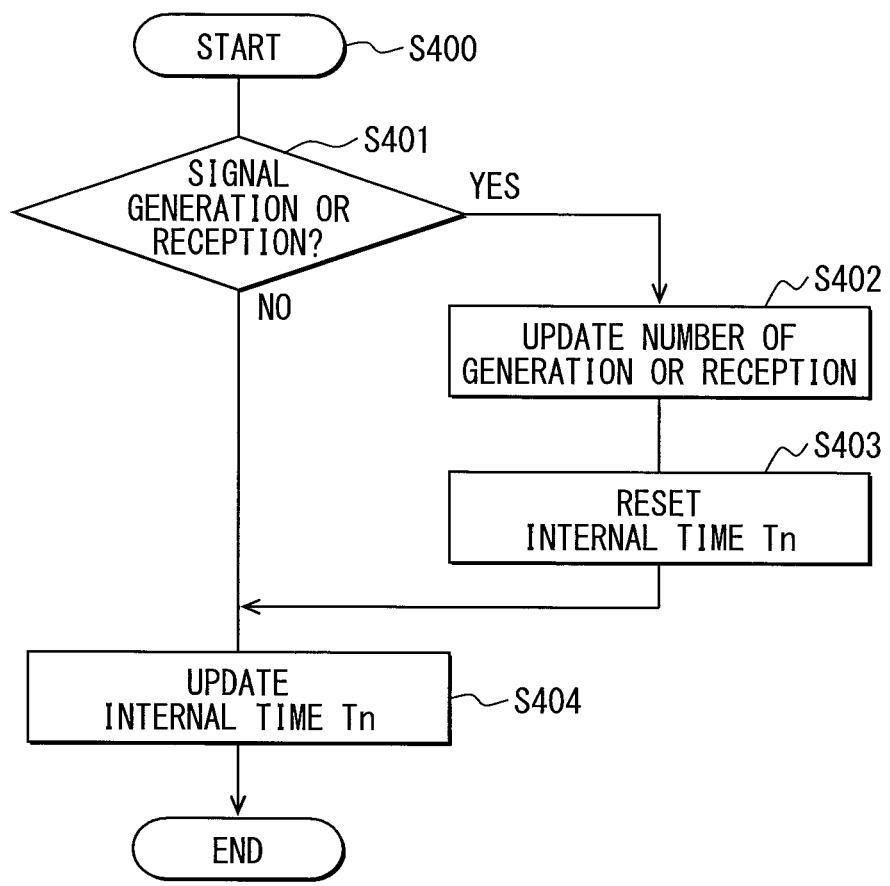
FIG. 15 is a flowchart showing internal time synchronization processing executed by a control unit of the torque transfer system according to the fifth embodiment.

A torque transfer system according to a fifth embodiment is shown in FIG. 14. The fifth embodiment is different from the fourth embodiment in the configuration of a control unit (ECU 70) and in the synchronization operation of the internal time in each ECU.

In the fifth embodiment, the ECU 70 includes only the signal line 74 and does not include the signal line 75. In the signal line 74, a signal Sr flows as a synchronization signal. The signal Sr is information, which includes an ID indicating processing with the highest priority. The signal Sr is generated by the HV-ECU 73 and outputted (transmitted) to the EFI-ECU 71 and the MG-ECU 72 at the same time. Each ECU executes the processing related to the signal Sr with priority (highest priority), when the signal Sr is generated or received.

The HV-ECU 73, the EFI-ECU 71 and the MG-ECU 72 execute a series of processing S400, which is related to synchronization of internal time, respectively, and shown in FIG. 14. This series of processing S400 is started in each of the HV-ECU 73, the EFI-ECU 71 and the MG-ECU 72, when the ignition key of the vehicle 2 is turned on.

At S401, each ECU checks whether the signal Sr is generated or received. If the signal Sr is generated or received (S401: YES), the ECU executes S402. If the signal Sr is not detected (S401: NO), the ECU executes S404.

At S402, the ECU updates the number of times of generation or reception of the signal Sr. Here, the count indicating the number of times of generation or reception of the signal Sr is incremented by one. The ECU executes S403 following S302.

At S403, the ECU resets the internal time Tn. Here, the internal time Tn is set to 0. The ECU executes S404 following S403.

At S404 following S401 or S403, the ECU updates the internal time Tn. Here, the ECU increments the internal time Tn by a predetermined value. The ECU finishes the series of processing S400 following S404.

With the ignition key being in the on-state when the series of processing S400 is finished following S404, S400 is executed again. That is, the series of processing S400 is repeated while the ignition key remains turned on.

As described above, the HV-ECU 73 transmits the signal Sr to the EFI-ECU 71 and the MG-ECU 72 at the same time as generating the signal Sr. Each ECU (HV-ECU 73, EFI-ECU 71 and MG-ECU 72) determines the internal time Tn by executing the series of processing S400. Thus each ECU can synchronize its internal time Tn.

The EFI-ECU 71 calculates at S101 the rotation speed of the first shaft 41 based on the rotation position of the first shaft 41 detected by the crank position sensor 81 when a predetermined time Tp elapses from the reception of the signal Sr for example, and then calculates the angular velocity ωe of the first shaft 41 based on the calculated rotation speed of the first shaft 41. The predetermined time Tp is shorter than a period of generation of the signal Sr. The EFI-ECU 71 outputs (transmits) a signal (information) to the HV-ECU 73 through the signal line 74. This signal is a combination of the calculated angular velocity ωe of the first shaft 41 and the count C of the counter at the time of detection of the rotation position of the first shaft 41.

The MG-ECU 72 calculates at S101 the rotation speeds of the fourth shaft 44 and the third shaft 43 based on the rotation positions of the fourth shaft 44 and the third shaft 43 detected by the resolvers 83 and 82 when the predetermined time Tp elapses from the reception of the signal Sr for example, and then calculates the angular velocities ωg and ωm of the fourth shaft 44 and the third shaft 43 based on the calculated rotation speeds of the fourth shaft 44 and the third shaft 43, respectively. The MG-ECU 72 outputs (transmits) signals (information) to the HV-ECU 73 through the signal line 74. These signals are a combination of the calculated angular velocity ωg of the fourth shaft 44 and the count C at the time of detection of the rotation position of the fourth shaft 44 and a combination of the calculated angular velocity ωm of the third shaft 43 and the count C at the time of detection of the rotation position of the third shaft 43.

The HV-ECU 73 executes the processing of S102, S103 and S104 in the similar manner as in the fourth embodiment. The MG-ECU 72 executes the processing of S105 and S106 in the similar manner as in the fourth embodiment. Since the ECU 70 (EFI-ECU 71, MG-ECU 72 and HV-ECU 73) executes the series of processing S100 as described above, the torque of the first rotary electric machine 10 is corrected and the tooth hammer sound of the torque split mechanism 60 is suppressed.

As described above, the EFI-ECU 71, the MG-ECU 72 and the HV-ECU 73 calculate respective internal times Tn based on the signal Sr, which flows in the signal line 74. The EFI-ECU 71, the MG-ECU 72 and the HV-ECU 73 calculate the differential value dθ/dt of the damper torsion angle θ while synchronizing time points of detecting the rotation positions of the first shaft 41, the third shaft 43 and the fourth shaft 44, and correct the torque of the first rotary electric machine 10. Thus the torque of the first rotary electric machine 10 can be corrected with high accuracy in the fifth embodiment, in which the ECU 70 is formed of the plurality of ECUs and the detection signals are outputted (transmitted) to other ECUs. As a result, the tooth hammer sound of the torque split mechanism 60 can be suppressed with high accuracy similarly to the fourth embodiment.

Other Embodiment

Figure 10A:
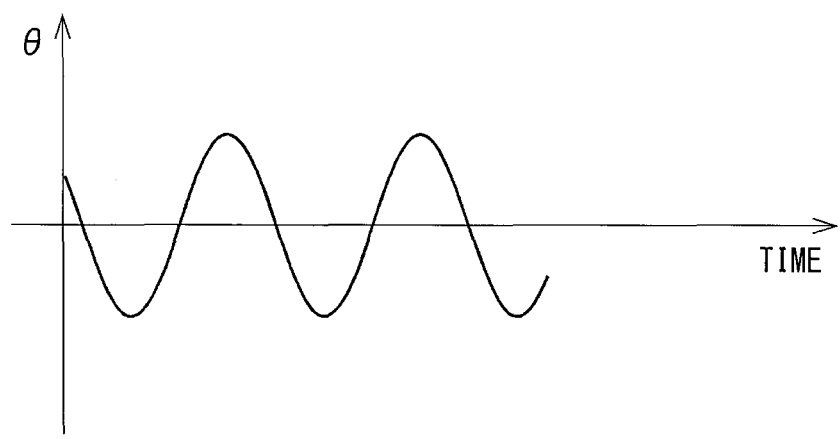
FIG. 10A and FIG. 10B are time charts showing a signal, which corresponds to the torsion angle of the resilient cushioning mechanism, and a signal, which results from shifting of phase and gain of the signal shown in FIG. 10A.
Figure 10B:
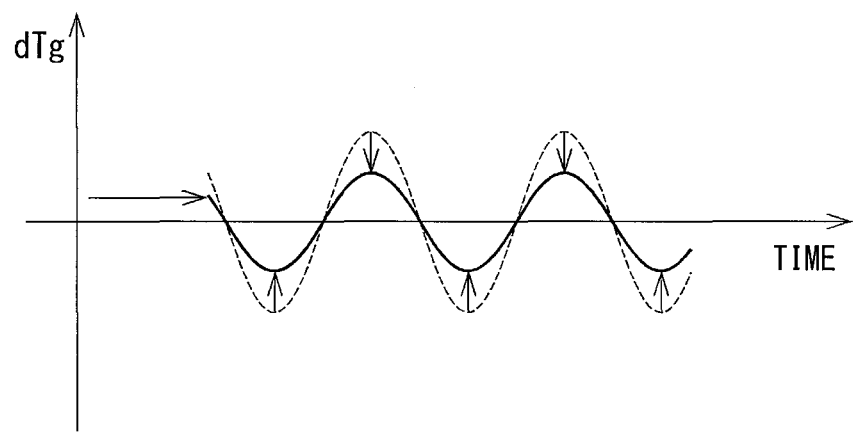

The ECU 70 may vary the phase and the gain (amplitude) of the signal corresponding to the torsion angle θ of the damper 50 ((A) in FIG. 10) and calculate the torque correction value based on the varied signal ((B) in FIG. 10). In this case, the tooth hammer sound of the torque split mechanism 60 can be suppressed furthermore. The ECU 70 may alternatively vary either one of the phase and the gain (amplitude) of the signal corresponding to the torsion angle θ of the damper 50 and calculate the torque correction value based on the varied signal The ECU 70 may calculate the damper torsion angle θ by integrating the differential value dθ/dt of the damper torsion angle θ calculated at S201, calculate the high frequency component θ' of the damper torsion angle θ as calculated at S202 and correct the torque of the first rotary electric machine 10.

The ECU 70 may calculate the differential value dθ/dt of the damper torsion angle θ by differentiating the damper torsion angle θ detected at S201, calculate the torque correction value dTg corresponding to the differential value dθ/dt as calculated at S104 and correct the torque of the first rotary electric machine 10.

In the fourth and the fifth embodiments, the ECU 70 is exemplified as including the EFI-ECU 71, the MG-ECU 72 and the HV-ECU 73. Alternatively, the ECU 70 may include only the EFI-ECU 71 and the MG-ECU 72 without the HV-ECU 73. In this case, the internal times of the ECUs can be synchronized by generating the synchronization signal by one of the EFI-ECU 71 and the MG-ECU 72 and outputting the generated synchronization signal to the other ECU.

Further, in the fourth and the fifth embodiments, the EFI-ECU 71 and the MG-ECU 72 are exemplified as calculating the rotation speeds and the angular velocities of the first shaft 41, the fourth shaft 44 and the third shaft 43 and outputting (transmitting) signals, which are sums of the calculated angular velocity and the count C, to the HV-ECU 73. Alternatively, the EFI-ECU 71 and the MG-ECU 72 may calculate the rotation speeds of the first shaft 41, the fourth shaft 44 and the third shaft 43 and output signals, which are sums of the calculated rotation speed and the count C. In this case, the HV-ECU 73 calculates the angular velocities of the first shaft 41, the fourth shaft 44 and the third shaft 43 based on the rotation speeds, which are calculated at the same count C.

The EFI-ECU 71 and the MG-ECU 72 may output to the HV-ECU 73 signals, which are sums of the detected rotation positions of the first shaft 41, the fourth shaft 44 and the third shaft 43 detected by the crank position sensor 81, the resolver 81 and the resolver 83 and the count C, respectively. In this case, the HV-ECU 73 calculates the rotation speeds and the angular velocities of the first shaft 41, the fourth shaft 44 and the third shaft 43 based on the rotation positions at the same count C.

In the fourth and the fifth embodiments, the HV-ECU 73 is exemplified as calculating the torque correction value dTg for the first rotary electric machine 10. Alternatively, the MG-ECU 72 may calculate the torque correction value dTg for the first rotary electric machine 10 based on the differential value dθ/dt of the damper torsion angle θ received from the HV-ECU 73.

As described above, as far as the time points of detecting the rotation positions of the first shaft 41, the fourth shaft 44 and the third shaft 43 are synchronized by the count C (internal time Tn) updated by the synchronization signal (signal Sg, signal Sr), the rotational speeds and the angular velocities of the first shaft 41, the fourth shaft 44 and the third shaft 43 as well as the torque correction value dTg of the first rotary electric machine 10 may be calculated by any one of the plurality of ECUs (EFI-ECU 71, MG-ECU 72 and HV-ECU 73).

In the fourth and the fifth embodiment, the HV-ECU 73 among the EFI-ECU 71, the MG-ECU 72 and the HV-ECU 73 is exemplified as generating the synchronization signal. Alternatively, the EFI-ECU 71 or the MG-ECU 72 may generate the synchronization signal.

Further, in the fourth embodiment, the EFI-ECU 71, the MG-ECU 72 and the HV-ECU 73 are exemplified as detecting at S301, as the edge of the signal Sg, the time point of rising of the pulse of the signal Sg generated or received. Alternatively, the EFI-ECU 71, the MG-ECU 72 and the HV-ECU 73 may detect at S301, as the edge of the signal Sg, the time point of falling of the pulse of the signal Sg generated or received.

In the fourth and the fifth embodiments, the signal line 74 is exemplified as transmitting the signal, which is defined in accordance with CAN protocol. Alternatively, the signal line may transmit a signal (control information), which is defined in accordance with LIN (Local Interconnect Network) protocol, FlexRay® protocol or independent protocol. The signal lines 74 and 75 may be paths such as optical fibers, which can transmit optical signals.

The resilient deformable part of the resilient cushioning mechanism 50 is not limited to the spring but may be an elastic member such as rubber.

The foregoing embodiments are described with reference to the effect of suppression of the tooth hammer sound generated at the time of engine starting. According to the torque transfer system, the effect of suppression of the tooth hammer sound is expected to be provided at normal travel time and acceleration time as well when the torque variation tends to occur.

A transmission may be provided between the ring gear 62 and the second rotary electric machine 20, that is, in the third shaft 43 so that the rotation of the second rotary electric machine 20 side of the third shaft 43 is speed-changed and transferred to the ring gear 62 side.

Further, the tooth hammer sound may be suppressed by correcting the torque of the second rotary electric machine 20.

The torque transfer system may be incorporated in a vehicle, which has no second rotary electric machine.

The torque transfer system is not limited to automotive vehicles but may be applied to other vehicles such as a ship, in which a final output shaft is coupled to a propeller shaft.

What is claimed is:

1. A torque transfer system configured to transfer torque of an internal combustion engine and a rotary electric machine to a final output shaft, the torque transfer system comprising:
    a first shaft having one end coupled to the internal combustion engine configured to receive the torque of the engine;
    a resilient cushioning mechanism having a resilient deformable part coupled to an other end of the first shaft;
    a second shaft having one end coupled to the resilient deformable part;
    a third shaft rotatable in correspondence to the final output shaft;
    a fourth shaft having one end coupled to the rotary electric machine configured to receive the torque of the rotary electric machine;
    a gear part provided among an other end of the second shaft, one end of the third shaft and an other end of the forth shaft configured to transfer torque one another among the second shaft, the third shaft and the fourth shaft; and
    a control unit configured to control the torque of the rotary electric machine,
    wherein the control unit includes a torque correction value calculation part configured to calculate a torque correction value, which is a correction value for a torque of the rotary electric machine, based on information indicating torsion angle of the resilient cushioning mechanism, which is a relative angle between the first shaft and the second shaft, and
    wherein the control unit further includes a torque correction part configured to correct the torque of the rotary electric machine based on the torque correction value calculated by the torque correction value calculation part.

2. The torque transfer system according to claim 1, further comprising:
    a torsion angle detection part configured to detect the torsion angle of the resilient cushioning mechanism.

3. The torque transfer system according to claim 1, wherein:
    the torque correction value calculation part calculates the torque correction value based on a differential value of the torsion angle of the resilient cushioning part.

4. The torque transfer system according to claim 3, further comprising:
    a first shaft rotation position detection part configured to detect a rotation position of the first shaft;
    a third shaft rotation position detection part configured to detect a rotation position of the third shaft; and
    a fourth shaft rotation position detection part configured to detect a rotation position of the fourth shaft,
    wherein the torque correction value calculation part calculates the differential value of the torsion angle of the resilient cushioning mechanism based on the rotation position of the first shaft detected by the first shaft rotation position detection part, the rotation position of the third shaft detected by the third shaft rotation position detection part, the rotation position of the fourth shaft detected by the fourth shaft rotation position detection part.

5. The torque transfer system according to claim 4, wherein:
    the control unit includes a first control part configured to control the internal combustion engine and a second control part for controlling the rotary electric machine;
    the first shaft rotation position detection part outputs a signal related to a detected rotation position of the first shaft to the first control part;
    the third shaft rotation position detection part outputs a signal related to a detected rotation position of the third shaft to the second control part; and
    the fourth shaft rotation position detection part outputs a signal related to a detected rotation position of the fourth shaft to the second control part.

6. The torque transfer system according to claim 5, wherein:
    the control unit has a signal line connecting the first control part and the second control part;
    the first control part and the second control part calculate respective internal times based on a synchronization signal transmitted through the signal line; and
    the torque correction value calculation part calculates the differential value of the torsion angle of the resilient cushioning mechanism while synchronizing time points of detection of the rotation positions of the first shaft, the third shaft and the fourth shaft based on the internal times.

7. The torque transfer system according to claim 6, wherein:
    the control unit further includes a third control part configured to control the internal combustion engine and the rotary electric machine through the first control part and the second control part;
    the signal lines connect the first control part, the second control part and the third control part;
    the first control part, the second control part and the third control part calculate respective internal times based on the synchronization signal; and
    any one of the first control part, the second control part and the third control part generates the synchronization signal.

8. The torque transfer system according to claim 1, wherein:
    the torque correction value calculation part calculates the torque correction value based on a high frequency component of a signal corresponding to the torsion angle of the resilient cushioning mechanism.

9. The torque transfer system according to claim 1, wherein:
    the torque correction value calculation part varies at least one of a phase or a gain of a signal corresponding to the torsion angle of the resilient cushioning mechanism and calculates the torque correction value based on a varied signal.

10. The torque transfer system according to claim 1, wherein:
    the resilient deformable part maintains the first shaft and the second shaft to be relatively rotatable by the torsion angle.

* * * * *